US012212929B2

(12) United States Patent
Verhulst et al.

(10) Patent No.: US 12,212,929 B2
(45) Date of Patent: Jan. 28, 2025

(54) CLOSED-LOOP METHOD TO INDIVIDUALIZE NEURAL-NETWORK-BASED AUDIO SIGNAL PROCESSING

(71) Applicant: UNIVERSITEIT GENT, Ghent (BE)

(72) Inventors: Sarah Verhulst, Ghent (BE); Fotios Drakopoulos, Ghent (BE); Arthur Van Den Broucke, Knokke-Heist (BE); Sarineh Keshishzadeh, Ghent (BE)

(73) Assignee: UNIVERSITEIT GENT, Ghent (BE)

( * ) Notice: Subject to any disclaimer, the term of this patent is extended or adjusted under 35 U.S.C. 154(b) by 0 days.

(21) Appl. No.: 17/802,983

(22) PCT Filed: Apr. 1, 2021

(86) PCT No.: PCT/EP2021/058655
§ 371 (c)(1),
(2) Date: Aug. 29, 2022

(87) PCT Pub. No.: WO2021/198438
PCT Pub. Date: Oct. 7, 2021

(65) Prior Publication Data
US 2023/0156413 A1  May 18, 2023

(30) Foreign Application Priority Data

Apr. 1, 2020 (EP) .................................. 20167538

(51) Int. Cl.
*H04R 25/00* (2006.01)
(52) U.S. Cl.
CPC ......... *H04R 25/507* (2013.01); *H04R 25/606* (2013.01)

(58) Field of Classification Search
CPC .............. H04R 25/507; A61N 1/36038; A61N 1/36039
See application file for complete search history.

(56) References Cited

U.S. PATENT DOCUMENTS 4,953,112 A * 8/1990 Widin ................... H04R 25/70
73/585
9,401,153 B2 * 7/2016 Sharma ................. G10L 19/028
(Continued)

FOREIGN PATENT DOCUMENTS

| CN | 110520188 A | 11/2019 |
|----|-------------|---------|
| CN | 117275568 A * | 12/2023 |
| WO | 2020023585 A1 | 1/2020 |

OTHER PUBLICATIONS

Chung-Hwa Chang et al., "A neural network model for optimizing vowel recognition by cochlear implant listeners," IEEE Transactions on Neural Systems and Rehabilitation Engineering, vol. 9, No. 1, Mar. 1, 2001, pp. 42-48, XO055724323, DOI:10.1109/7333.918275.

(Continued)

*Primary Examiner* — Ryan Robinson
(74) *Attorney, Agent, or Firm* — Amster, Rothstein & Ebenstein LLP

(57) ABSTRACT

The present invention is in the field of auditory devices. In particular, the present invention provides a method for converting an auditory stimulus to a processed auditory output. The present invention also relates to uses of the method, auditory devices configured to perform the method, and computer programs configured to perform the method for converting an auditory stimulus to a processed auditory output.

17 Claims, 9 Drawing Sheets

(56) References Cited

U.S. PATENT DOCUMENTS

| | | | |
|---|---|---|---|
| 2005/0069162 A1 | 3/2005 | Haykin et al. | |
| 2010/0257129 A1* | 10/2010 | Lyon | G06F 16/683 707/723 |
| 2016/0027342 A1 | 1/2016 | Ben-Haim | |
| 2018/0014130 A1* | 1/2018 | Lunner | A61F 11/06 |
| 2019/0034791 A1 | 1/2019 | Busch et al. | |
| 2019/0132687 A1* | 5/2019 | Santos | H04R 25/50 |

OTHER PUBLICATIONS

PCT International Search Report mailed on Jul. 12, 2021 in connection with PCT/EP2021/058655.

PCT Written Opinion of the International Searching Authority Report mailed on Jul. 12, 2021 in connection with PCT/EP2021/058655.

European Office Action as Issued On Feb. 1, 2024 in Respect to Counterpart European Patent Application No. 21-713 872.6.

Deepak Baby et al: "A convolutional neural-network model of human cochlear mechanics and filter tuning for real-time applications" arxiv.org, Cornell University Library, 201 Olin Library Cornell University Ithaca, NY 14853, Oct. 1, 2020 (Oct. 1, 2020) XP081775315.

Chinese Office Action as Issued on Jun. 25, 2024 in Respect to Counterpart Chinese Patent Application No. 202180026269.5 and Its English Translation.

Chinese Office Action as Issued On Nov. 5, 2024 in Respect of the Equivalent Chinese Patent Application No. 202180026269.5 and its English Deepl Translation.

"Proceedings of the 1st China ITS Annual Meeting", edited by the Organizing Committee of the 1st China ITS Annual Meeting, Tongji University Press, Dec. 2005, pp. 300-301, English language translation.

\* cited by examiner

CLOSED-LOOP METHOD TO INDIVIDUALIZE NEURAL-NETWORK-BASED AUDIO SIGNAL PROCESSING

CROSS-REFERENCE TO RELATED APPLICATIONS

This application is a U.S. national stage entry under 35 U.S.C. § 371 of PCT International Patent Application No. PCT/EP2021/058655, filed Apr. 1, 2021, which claims priority to European Patent Application No. 20167538.6, filed Apr. 1, 2020, the contents of which are incorporated herein by reference in their entirety.

TECHNICAL FIELD

The present invention is in the field of auditory devices. In particular, the present invention provides a method for converting an auditory stimulus to a processed auditory output. The present invention also relates to uses of the method, auditory devices configured to perform the method, and computer programs configured to perform the method for converting an auditory stimulus to a processed auditory output.

BACKGROUND

During the last decade, the number of people suffering from hearing loss has been steadily increasing, while society is constantly exposed to an increasingly loud environment and lifestyle. Yet, proper diagnosis and treatment of hearing impairment is still not clear, even though extensive research has been conducted on the compensation of cochlear gain loss over the past years. To address this issue, computational models of the human auditory periphery can be used as a tool to develop efficient auditory signal-processing algorithms, with the aim to restore degraded auditory representations of speech, for example caused by outer hair cell loss. At the same time, these computational models can benefit the new field of "augmented hearing", in which sound signals are transformed in such a way to enhance a listener's hearing experience. Model-inspired audio signal processing manipulations could render improved sound perception or sound quality, or incorporate noise-reduction or other manipulations. However, it is still not straightforward how to devise such processing methods that can accurately compensate for different kinds of hearing impairment or create augmented hearing algorithms which work efficiently for complex stimuli such as speech.

To provide an example for audio-signal processing in hearing aids: hearing-aid algorithms are typically optimized to compensate for frequency-specific damage of outer-hair-cells in the inner-ear (or, cochlea), e.g. NAL-NL or DSL schemes. Consequently, the signal processing algorithms do not incorporate an important aspect of sensorineural hearing loss which relates to damaged synapses between the cochlear inner-hair-cells and the auditory nerve (synaptopathy). At the same time, it is presently rare to include metrics derived from biophysical signals such as otoacoustic emissions (OAEs), middle-ear-muscle reflex (MEMR) responses or auditory-evoked potentials (AEPs) to individualize the processing of hearing-aid algorithms.

Several attempts have been made to automate and predict human auditory performance for basic sound perception tasks. This type experiments are time-consuming to conduct, and hence there is a benefit to use a model of the listener instead. These systems typically use an (individualized) auditory model (front-end) as input to a task simulation system (back-end), usually an automatic speech recognition (ASR) system which can be used to train and predict task performance on a sound perception task (i.e., psychoacoustics). Psychoacoustic tasks are used to objectively quantify the sound perception capabilities of an individual and a typical task is the measurement of speech intelligibility in noise, i.e. determine the SNR threshold at which a listener can correctly identify 50% of words in a sentence. However, it remains a challenge to develop a system that can predict the outcome of different experiments and which generalizes well across listeners, taking into consideration individual aspects such as their hearing impairment or language.

SUMMARY OF THE INVENTION

The present invention overcomes one or more of these issues. Preferred embodiments of the present invention overcome one or more of these issues.

It is an advantage of embodiments of the present invention that they account for how synaptopathy affects suprathreshold speech encoding, and helps those individuals whose speech intelligibility is not adequately restored on the basis of gain prescription alone.

It is an advantage of embodiments of the present invention that individually-based restoration algorithms for synaptopathy offer a means to help improve speech intelligibility in self-reported listeners with normal audiograms, who are currently left untreated.

It is an advantage of embodiments of the present invention that the model-based processing algorithms take into account the individual degree of synaptopathy as well as other aspects of sensorineural hearing loss.

It is an advantage of embodiments of the present invention that they can include both OAE and AEP metrics to build individualized hearing-loss models which will serve as the basis for the processing algorithms.

It is an advantage of embodiments of the present invention that they include NN-based auditory models that can provide a differentiable auditory response.

It is an advantage of embodiments of the present invention that they include NN-based auditory models that can accurately describe the processing of the auditory periphery (auditory processing) in a biophysically-inspired manner.

It is an advantage of embodiments of the present invention that they include a NN-based auditory model that can capture the properties of the auditory periphery up to the level of the inner-hair-cell and auditory-nerve processing and population responses derived thereof. It is an advantage of embodiments of the present invention that they include a NN-based auditory model that can include outer-hair-cell damage, inner-hair-cell damage, cochlear synaptopathy, or even combinations of hearing loss in all different stages of the auditory periphery.

It is an advantage of embodiments of the present invention that they include a NN-based auditory model that can simulate auditory brainstem responses, providing the ability to restore the generators of auditory evoked potentials.

It is an advantage of embodiments of the present invention that they use accurate NN-based auditory models as inputs to NN-based automatic speech recognition (ASR) systems, to simulate the degraded performance of hearing-impaired listeners in speech intelligibility tasks and compensate for this.

It is an advantage of embodiments of the present invention that they use a closed-loop approach, based on the aforementioned NN-based auditory models, to generate a NN-based processing model that can minimize a properly devised metric which reflects the degraded hearing ability and perception of a human listener.

The present invention relates to an artificial neural network-based method for obtaining an individualized auditory signal processing model suitable for converting an auditory stimulus to a processed auditory output. The method preferably comprises the steps of:

a. obtaining, preferably generating, a neural network-based personalized auditory response model, said personalized auditory response model representing an expected auditory response of a subject with an auditory profile to the auditory stimulus;

b. comparing the output of the personalized auditory response model with the output of a neural network-based desired auditory response model to determine an auditory response difference; whereby the auditory response difference is differentiable, i.e. it can be used to train/develop a neural network model that can back-propagate to the solution; and, c. using the determined differentiable auditory response difference to develop a neural network-based individualized auditory signal processing model of the subject, wherein the individualized auditory signal processing model is configured to minimize the determined auditory response difference.

The method can thereby obtain an individualized auditory signal processing model that is capable of processing the auditory stimulus to produce the processed auditory output that matches the desired auditory response, when given as an input to the personalized auditory response model or to the subject.

The present invention also relates to an artificial neural network-based method for converting an auditory stimulus to a processed auditory output. The method preferably comprises the step of obtaining an individualized auditory signal processing model as described herein, or embodiments thereof; and, d. applying the individualized neural network-based auditory signal processing model to the auditory stimulus to produce a processed auditory output, that preferably matches the desired auditory response, when given as an input to the personalized auditory response model or to the subject.

The present invention also relates to an artificial neural network-based method for obtaining an individualized auditory signal processing model suitable for converting an auditory stimulus to a processed auditory output, the method comprising the steps of:

a. generating a neural network-based personalized auditory response model based at least on the integrity of auditory nerve fibers (ANF) and/or synapses (ANS) in a subject preferably also on the integrity of inner hair cell (IHC) damage and/or outer hair cell (OHC) damage in said subject; said personalized auditory response model representing an expected auditory response of said subject with an auditory profile to the auditory stimulus;

b. comparing the output of the personalized auditory response model with the output of a neural network-based desired auditory response model to determine an auditory response difference; wherein said neural network-based models consist of non-linear operations that make the auditory response difference differentiable;

c. using the determined differentiable auditory response difference to develop a neural network-based individualized auditory signal processing model of the subject, wherein the individualized auditory signal processing model is configured to minimize the determined auditory response difference; and, d. applying the individualized neural-network-based auditory signal processing model to the auditory stimulus to produce a processed auditory output that matches the desired auditory response, when given as an input to the personalized auditory response model or to the subject.

In some preferred embodiments, the personalized auditory response model of step a. is determined by deriving and including a subject specific auditory profile.

In some preferred embodiments, the subject specific auditory profile is a subject specific auditory damage profile; preferably based on the integrity of auditory nerve fibers (ANF) and/or synapses (ANS), and/or based on the outer hair cell (OHC) damage in the subject.

In some preferred embodiments, the desired auditory response is the response from a normal-hearing subject or a response with enhanced features.

In some preferred embodiments, the desired auditory response model and the personalized auditory response model comprise models of different stages of the auditory periphery.

In some preferred embodiments, a reference neural network that describes a normal-hearing auditory periphery is used as the desired auditory response model; a corresponding hearing-impaired neural network is used as the personalized auditory response model; and the individualized auditory signal processing model is a signal processing neural network model trained to process the auditory input and compensate for the degraded output of the hearing-impaired model, when connected to the input of the hearing-impaired model or the subject.

In some preferred embodiments, a reference neural network that simulates augmented hearing perception and/or ability of a normal-hearing listener is used as the desired auditory response model; a corresponding normal-hearing or hearing-impaired neural network is used as the personalized auditory response model; and the individualized auditory signal processing model is a signal processing neural network model trained to process the auditory input and provide an augmented auditory response.

In some preferred embodiments, the individualized auditory signal processing model is trained to minimize a specific auditory response difference metric, such as the absolute or squared difference between the two auditory response models at several or all tonotopic frequencies.

In some preferred embodiments, the processed auditory output is selected from:

(i) a modified auditory stimulus which is devised to compensate for a hearing-impairment or yields augmented hearing; or, (ii) a modified auditory response corresponding to a specific processing stage along the auditory pathway, which can for example be used to stimulate auditory prostheses such as cochlear implants or deep brain implants.

In some preferred embodiments, the difference of auditory-nerve outputs of a normal-hearing and a hearing-impaired periphery is minimized; or the difference between simulated auditory brainstem and/or cortical responses, expressed in the time or frequency domain, is minimized.

In some preferred embodiments, a task-optimized speech 'back-end' which simulates the performance of listeners in different tasks is connected to the outputs of the auditory response models, also referred to as 'front-ends'; and the outputs of the back-end are used to determine and minimize the auditory response difference.

In some preferred embodiments, the method is for configuring an auditory device, wherein the auditory device is a cochlear implant or a wearable hearing aid.

The present invention also relates to the use of the method as described herein, or embodiments, thereof in a hearing-aid application.

The present invention also relates to a processing device, such as the processing unit of an auditory device, which is configured for performing the method as described herein, and/or any embodiments thereof. Preferably, the processing unit is configured for:

a. generating a neural network-based personalized auditory response model based at least on the integrity of auditory nerve fibers (ANF) and/or synapses (ANS) in a subject preferably also on the integrity of inner hair cell (IHC) damage and/or outer hair cell (OHC) damage in said subject; said personalized auditory response model representing an expected auditory response of said subject with an auditory profile to the auditory stimulus;

b. comparing the output of the personalized auditory response model with the output of a neural network-based desired auditory response model to determine an auditory response difference; wherein said neural network-based models consist of non-linear operations that make the auditory response difference differentiable;

c. using the determined differentiable auditory response difference to develop a neural network-based individualized auditory signal processing model of the subject, wherein the individualized auditory signal processing model is configured to minimize the determined auditory response difference; and d. applying the individualized neural-network-based auditory signal processing model to the auditory stimulus to produce a processed auditory output that matches the desired auditory response, when given as an input to the personalized auditory response model or to the subject.

The present invention also relates to an auditory device, preferably a cochlear implant or wearable hearing aid, which comprises a processing device configured for performing the method as described herein, and/or any embodiments thereof.

In some preferred embodiments the auditory device comprises:
an input device configured to pick up an input sound wave from the environment and convert the input sound wave to an auditory stimulus;
a processing unit, configured for performing the method as described herein, and/or any embodiments thereof; and,
an output device configured to produce the processed auditory output from the processor.

In some preferred embodiments the auditory device comprises:
an input device disposed on the auditory device, the input device configured to pick up an input sound wave from the environment and convert the input sound wave to an auditory stimulus;
a processing unit, configured for performing the method as described herein, and/or any embodiments thereof; and,
an output device disposed on the auditory device, the output device configured to produce the processed auditory output from the processor.

The present invention also relates to a computer program, or a computer program product directly loadable into the internal memory of a computer, or a computer program product stored on a computer readable medium, or a combination of such computer programs or computer program products, configured for performing the method as described herein, or embodiments thereof.

DESCRIPTION OF THE FIGURES

The following description of the figures of the invention is only given by way of example and is not intended to limit the present explanation, its application or use. In the drawings, identical reference numerals refer to the same or similar parts and features.

DETAILED DESCRIPTION OF THE INVENTION

Figure 1:
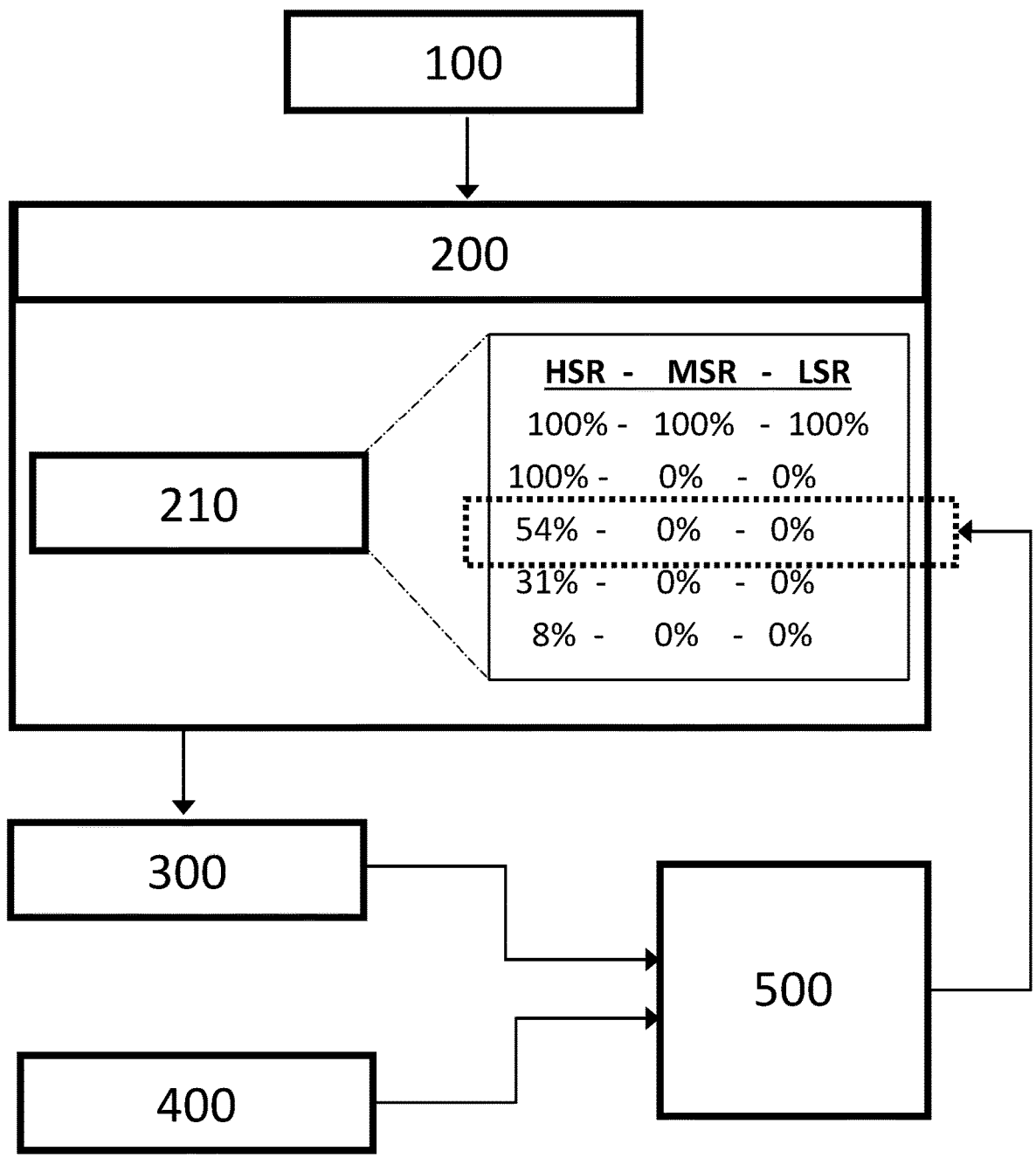
FIG. 1 presents a flow-chart of the preferred steps for determining an auditory nerve fiber and synapse profile, and optionally using reference data to determine a subject specific auditory profile. Such a profile can be used in a method according to some embodiments of the invention.

As used below in this text, the singular forms "a", "an", "the" include both the singular and the plural, unless the context clearly indicates otherwise.

The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

Percentages as used herein may also be noted as dimensionless fractions or vice versa. A value of 50% may for example also be written as 0.5 or ½.

Unless defined otherwise, all terms disclosed in the invention, including technical and scientific terms, have the meaning which a person skilled in the art usually gives them. For further guidance, definitions are included to further explain terms which are used in the description of the invention.

The present invention relates to an artificial neural network-based method for obtaining an individualized auditory signal processing model suitable for converting an auditory stimulus to a processed auditory output. The method preferably comprises the steps of:

a. obtaining, preferably generating, a neural network-based personalized auditory response model, said personalized auditory response model representing an expected auditory response of a subject with an auditory profile to the auditory stimulus;

b. comparing the output of the personalized auditory response model with the output of a neural network-based desired auditory response model to determine an auditory response difference; whereby the auditory response difference is differentiable, i.e. it can be used to train/develop a neural network model that can back-propagate to the solution; and, c. using the determined differentiable auditory response difference to develop a neural network-based individualized auditory signal processing model of the subject, wherein the individualized auditory signal processing model is configured to minimize the determined auditory response difference.

The method can thereby obtain an individualized auditory signal processing model that is capable of processing the auditory stimulus to produce the processed auditory output that matches the desired auditory response, when given as an input to the personalized auditory response model or to the subject.

The present also relates to an artificial neural network-based method for converting an auditory stimulus to a processed auditory output. The method preferably comprises the step of obtaining an individualized auditory signal processing model as described herein, or embodiments thereof; and, d. applying the individualized neural-network-based auditory signal processing model to the auditory stimulus to produce a processed auditory output, that preferably matches the desired auditory response, when given as an input to the personalized auditory response model or to the subject.

In some embodiments, the method is a computer-implemented method.

In some preferred embodiments, the subject is a human or animal subject, preferably a human subject. In some embodiments, the human subject suffers from hearing damage. In some embodiments, the human subject suffers from synaptopathy. In some embodiments, the human subject suffers from outer hair cell (OHC) loss. In some embodiments, the human subject suffers from inner hair cell (IHC) damage. In some embodiments, the human subject suffers from demyelination. In some embodiments, the human subject suffers from presbycusis or brainstem/midbrain inhibition changes. In some embodiments, the human subject suffers from the aforementioned types of hearing damage in various stages of the auditory periphery. In some embodiments, the human subject suffers from both synaptopathy and outer hair cell (OHC) loss in particular, for example through ageing or noise exposure. The method can be applied to most people of all ages and sorts of sensorineural hearing disorders and can be in different conditions: watching a movie, asleep, subconscious, non-verbal (e.g. neonates). Also, people undergoing cancer treatment may be considered.

The method according to the present invention preferably comprises the step of:
  a. obtaining, preferably generating, a neural network-based personalized auditory response model, said personalized auditory response model representing an expected auditory response of a subject with an auditory profile to the auditory stimulus.

The personalized auditory response model can be predetermined or determined using measured responses (e.g. AEP, OAE) of a subject to sensitive stimuli or using performance outcomes of psychoacoustic tasks, such as a speech intelligibility or an amplitude-modulation (AM) detection task. As used herein, the term "auditory evoked potential" (AEP) refers to a type of EEG signal emanated from the brain scalp by an acoustical stimulus. As used herein, the term "otoacoustic emission" (OAE) refers to a sound which is generated from within the inner ear, which is typically recorded using a sensitive microphone and which is often used as a measure of inner ear health.

The artificial neural networks (ANN or NN) as used herein are preferably deep neural networks (DNN), preferably with at least 2 layers between the input layer and the output layer. The neural networks can be convolutional neural networks (CNN).

Neural networks-based models in the present disclosure may consist of non-linear operations that make the auditory response difference differentiable. The term "differentiable" as understood in the art with reference to neural networks refers to mathematical models that have computable gradients and are capable of reiterating at least one component by optimizing along the gradient using a mathematical optimization algorithm. Accordingly, the provision of a differentiable neural network-based model can enable the use of gradient-based optimization of parameters such as gradient descent in the model to accurately solve the problem. Hence differentiability is an intrinsic property of the present neural network-based model that can enable training of said model to back-propagate to the solution that in other cases would be impossible to reach via e.g. gradient-free optimization without resorting to mathematical simplifications that sacrifice model accuracy to solve the problem. The person skilled in the art knows which mathematical expressions are differentiable, and since most Neural Networks only comprise differentiable components, the person skilled in the art has no difficulties choosing a differentiable NN-based model.

In some embodiments the NN-based models typically consist of highly non-linear but parallel operations. This gives the advantage of further significantly speeding up the computations when implemented on a dedicated chip, compared to the computation of complex mathematical, feed-forward expressions. At the same time, these operations are differentiable, which means that a neural network can be trained to back-propagate to the solution that in other cases would be impossible to reach. Therefore, the method is preferably used in a closed-loop compensation approach.

Using NN-based auditory models, the aforementioned difference signal is differentiable and reflects the specific degraded hearing-ability.

An additional benefit of connecting the fields of individualized neural-network (NN) based models of auditory signal processing and NN-based audio signal processing is that this combination can improve performance of state-of-art speech recognition, noise suppression, sound quality and robotics systems to work at more adverse conditions such as negative signal-to-noise ratios (SNRs). NN-based auditory signal processing models, classifiers or recognition systems can help draw from the extraordinary frequency selectivity and noise-reduction capabilities of the human cochlea which facilitates speech-in-noise perception at negative signal-to-noise (SNR) ratios (<−6 dB), while spectro-temporal traditional audio-signal processing applications start to fail at SNRs below 0 dB.

Auditory stimuli, in the context of the present invention, can be manifold and refer to acoustic signals (e.g. pressure waves) susceptible to human or animal hearing, e.g. signals comprising and conveying acoustic energy in the range from approximately 20 Hz to approximately 20 kHz for the human auditory system depending on age and health. Evidently, for non-human animals, different frequency ranges apply. As used herein, the term "auditory processing" refers to processing of sound by the auditory periphery, and includes cochlear and neural processing of sound across various stages in the ascending auditory pathway. Therefore, the term "auditory processing" as used herein can refer to processing of the auditory periphery or pathways, which includes cochlear processing, as well as brain stem and mid-brain neuronal processing and processing of neuronal populations of any of the previous steps. The term "cochlear processing" hence refers to processing taking place in the middle ear, on the basilar-membrane (BM), within the outer- and inner-hair-cells (OHC & IHC), auditory-nerve fiber (ANF) synapses and neurons.

As used herein, the term "individualized auditory response model" is preferably defined as a NN-based model of the biophysical sound-processing stages along the auditory pathway. The NN-based model can include stages which correspond to ear-canal, middle-ear, cochlear basilar-membrane filtering as well as to responses from cochlear neural elements such as the inner- and outer-hair-cells (IHC & OHC), auditory-nerve fibers (ANF), brainstem/midbrain neurons and their synapses. In addition, population responses from several of these elements can form the outcome of the individualized models: e.g. otoacoustic emissions (OAE), which are a population basilar-membrane and OHC response; and auditory-evoked potentials (AEP), which is a neuronal population response generated at the level of the ANFs and/or brainstem/midbrain neurons. The personalized auditory response model can individualize one or more frequency-dependent parameters related to hearing-impairment of the above-mentioned structures. The model can be a single NN-model which covers all aspects of hearing-impairment and auditory processing, or can be made up of modules which each cover a specific aspect of auditory processing and/or hearing damage.

As used herein, the term "individualized auditory signal processing model" is preferably defined as a NN-based auditory signal processing algorithm, which has as an input an auditory stimulus, and as a processed auditory output for example either (i) a modified auditory stimulus which is devised to compensate for a hearing-impairment or yields augmented hearing, or (ii) a modified auditory response corresponding to a specific processing stage along the auditory pathway which can for example be used to stimulate auditory prostheses such as cochlear implants or deep brain implants.

Therefore, in some preferred embodiments, the processed auditory output is selected from:
(i) a modified auditory stimulus which is devised to compensate for a hearing-impairment or yields augmented hearing; or,
(ii) a modified auditory response corresponding to a specific processing stage along the auditory pathway, which can for example be used to stimulate auditory prostheses such as cochlear implants or deep brain implants.

As used herein, the terms "augmented hearing" and "augmented auditory response" preferably relates to the purpose of the individualized auditory signal processing algorithm. Besides compensating for individual forms of hearing damage, the algorithms can be devised to improve hearing (even for normal-hearing listeners), by either aiming to improve the perception or quality of hearing or improving auditory responses (e.g. the AEP, OAE). This can be achieved by aiming to perform noise reduction, or by enhancing certain neural response features by means such as audio-signal onset or modulation enhancement.

In some preferred embodiments, the personalized auditory response model of step a. is determined by deriving and including a subject specific auditory profile.

This step is preferably performed beforehand, using sensitive metrics to measure the subject's bio-responses (e.g. OAEs, AEPs) to specific sound stimuli or with the use of an additional sensor which detects human bio-signals. These data are compared against model simulations to determine the best-matching auditory profile.

In some preferred embodiments, the subject specific auditory profile is a subject specific auditory damage profile; preferably based on the integrity of auditory nerve fibers (ANF) and/or synapses (ANS), and/or based on the outer hair cell (OHC) damage in the subject.

Hearing loss can be attributable to several measurable factors in various stages of the auditory periphery, as known to the person skilled in the art, including but not limited to:
outer hair cell (OHC) damage/loss;
auditory nerve (AN) dysfunction or loss;
inner hair cell (IHC) damage/loss;
demyelination;
presbycusis; and,
neural inhibition strength alternations.

Once the exact auditory profile of hearing loss (auditory damage profile) is estimated for an individual, an individualized signal processing auditory response model can be developed, for example that can accurately compensate for a specific hearing-impairment. In some embodiments, the method comprises the step of developing an individualized hearing-aid signal processing model, as described herein. The auditory damage profile can include outer-hair-cell damage, inner-hair-cell damage, cochlear synaptopathy, brainstem inhibition changes, or even combinations of hearing loss in all different stages of the auditory periphery such as those described above. Using sensitive metrics based on otoacoustic emissions (OAEs) and auditory-evoked potentials (AEPs), individualized models can be built that can account for individual synaptopathy and hair-cell damage aspects.

In some embodiments, using sensitive metrics based on otoacoustic emissions (OAEs) and auditory-evoked potentials (AEPs), a personalized auditory response model is built that can account for both synaptopathy and outer-hair-cell damage. Therefore, preferably, the personalized auditory response model comprises both synaptopathy and outer-hair-cell damage.

In some embodiments, the subject specific auditory damage profile comprises an auditory nerve fiber and/or synapse damage profile; i.e., the auditory damage profile is based on the integrity of auditory nerve fibers (ANF) and/or synapses (ANS).

In some embodiments, the subject specific auditory damage profile comprises an outer hair cell damage profile; i.e., the auditory damage profile is based on the integrity of outer hair cells (OHC).

In some embodiments, the subject specific auditory damage profile comprises an inner hair cell damage profile; i.e., the auditory damage profile is based on the integrity of inner hair cells (IHC).

In some embodiments, the subject specific auditory damage profile comprises a demyelination damage profile.

In some embodiments, the subject specific auditory damage profile comprises a presbycusis damage profile.

In some embodiments, the subject specific auditory damage profile comprises a brainstem/midbrain inhibition change profile.

In some embodiments, the subject specific auditory damage profile comprises an auditory nerve fiber and/or synapse damage and outer hair cell damage profile; i.e., the auditory damage profile is based on the integrity of auditory nerve fibers (ANF) and/or synapses (ANS), and on the outer hair cell (OHC) damage in the subject.

In some embodiments, the subject specific auditory damage profile comprises a brainstem/midbrain damage, an auditory nerve fiber and/or synapse damage and hair cell damage profile; i.e., the auditory damage profile is based on the integrity of brainstem/midbrain, on the integrity of auditory nerve fibers (ANF) and/or synapses (ANS), and on the hair cell damage in the subject.

The developed neural network model of the auditory periphery can also be of help in this step, by providing a much faster way to cluster experimental data to simulated outputs so that an individualized profile of hearing loss can be built with better accuracy. For this, preconfigured hearing-impaired personalized auditory response models can be used that include different aspects of hearing loss in variable degrees.

The term "integrity" can thus relate to either or both of the functioning or loss of elements in the auditory periphery, such as inner hair cell loss, outer hair cell loss, or other types of hearing damage as described herein. For example, ANF integrity may refer to either or both of the functioning of remaining ANFs, as well as to their innervation by afferent cochlear synapses (ANSs). The term "integrity" can also relate to the quantification of the number and/or types of damaged elements in the auditory periphery, such as inner hair cell loss, outer hair cell loss, or damaged ANFs and/or ANSs. The terms "measuring the integrity" or "determining the integrity" as used herein, can interchangeably refer to either a qualitative measurement or to a quantitative measurement. By Incorporating at least ANF and/or ANS integrity into the network-based personalized auditory response model, a biophysically accurate model can be generated that can be personalized to suit a subgroup of individuals and/or to suit a single individual.

The auditory damage may be assessed by any means in the art known to the skilled person. For example, it has been found that ANFs show a strong response to a specific auditory stimulation (audio stimulation or stimulus), i.e., the auditory stimulation is able to evoke a highly synchronized ANF response across a population of ANFs and ANSs along the cochlea. The ANF response may be recorded through measurement of the electrical activity of the brain. This activity is either mapped via invasive recording electrodes (in animals) or by means of Electroencephalography (EEG, in humans or animals), preferably AEP. For EEG, a number of electrodes are attached to the scalp of a subject that will record all brain activity as wave patterns. The EEG data may be processed to determine the integrity of ANFs and/or ANSs in subjects. The integrity may be determined for the whole or a subset of the ANF population. Other functional neuroimaging techniques may be used for the present invention. For example, brain activity of a subject can also be mapped through Magnetoencephalography (MEG) or the electrocochleogram (EcochG). The skilled person understands that EcochG/MEG data can be processed in a way equivalent to embodiments describing EEG-data and application of the present auditory stimulation is not limited to any specific neuroimaging technique. Data from different neuroimaging and/or auditory test may also be combined to obtain more accurate or alternative results, such as determining damage to other auditory components, such as outer hair cell (OHC) damage. In some embodiments, the subject specific damage profile may be expanded to also include, e.g., simulated and/or experimental frequency-specific OHC damage profiles. The OHC damage profiles can be determined based on experimental data, i.e., estimates of frequency-specific OHC damage (e.g. derived from audiogram test, otoacoustic emissions). Alternatively, the OHC damage profiles can be kept variable such that the matching algorithm can be optimized both for ANF and OHC profiles simultaneously.

In some embodiments, the auditory damage profile is obtained through brain activity data, for example through AEP. In some embodiments, the brain activity data is obtained from signals, preferably the signals are EEG (Electroencephalography) or MEG (Magnetoencephalography) signals, preferably EEG signals, preferably AEP signals. The present EEG and MEG methods can provide a non-invasive approach for hearing screening with high temporal precision. As used herein, the term "EEG" also comprises EcochG (electrocochleogram), since this setup is basically an EEG recording from the ear-canal (tiptrodes) or transtympanic through the eardrum (needs clinical setup).

The method according to the present invention preferably comprises the step of:
b. comparing the output of the personalized auditory response model with the output of a neural network-based desired auditory response model to determine an auditory response difference; whereby the auditory response difference is differentiable, i.e. it can be used to train/develop a neural network model that can back-propagate to the solution.

In some embodiments, the desired auditory response is automatically determined based on an auditory response model of a subject without hearing loss. In some embodiments, the desired auditory response is determined based on a sensor input or data derived by a subject. In some embodiments, the desired auditory response is experimental or simulated.

In some embodiments, the desired auditory response is an augmented response. In some preferred embodiments, the desired auditory response is the response from a normal-hearing subject or a response with enhanced features.

A normal-hearing auditory periphery can simulate the hearing perception/ability of a normal-hearing listener. Examples of enhanced features include but are not limited to improved sound perception or sound quality, incorporated noise-reduction, or other manipulations.

In some embodiments, the desired auditory response is the response from a hearing-impaired subject. This can provide a processed audio stimulus which, when played back to a normal-hearing listener, will emulate the degradation of hearing experienced by a hearing-impaired listener.

In some embodiments, the desired auditory response model and the personalized auditory response model comprise task-oriented neural network auditory models, such as automatic speech recognition (ASR)/word recognition systems, speech enhancement models (noise suppression, de-reverberation), or audio/speech quality models.

In some embodiments, the desired auditory response model and the personalized auditory response model comprise psychoacoustic neural network models, such as a loudness model.

In some embodiments, the desired auditory response model and the personalized auditory response model comprise different combinations of neural network models, e.g. an auditory model (front-end) and an ASR system (back-end); or combinations of more models, e.g. a noise suppression model as an intermediate step between the front-ends and the back-ends. In some preferred embodiments, the desired auditory response model and the personalized auditory response model comprise models of different stages of the auditory periphery, as described herein.

The method according to the present invention preferably comprises the step of:
c. using the determined differentiable auditory response difference to develop a neural network-based individualized auditory signal processing model of the subject, wherein the individualized auditory signal processing model is configured to minimize the determined auditory response difference.

The neural network-based individualized auditory signal processing model can be used in various applications, depending on the selected personalized auditory response model and the desired auditory response model. Examples of such specific applications are illustrated below.

In some preferred embodiments, a reference neural network that describes a normal-hearing auditory periphery is used as the desired auditory response model; a corresponding hearing-impaired neural network is used as the personalized auditory response model; and the individualized auditory signal processing model is a signal processing neural network model trained to process the auditory input and compensate for the degraded output of the hearing-impaired model, when connected to the input of the hearing-impaired model or the subject. In some preferred embodiments, a reference hearing-impaired neural network is used as the desired auditory response model; a corresponding neural network that describes a normal-hearing auditory periphery is used as the personalized auditory response model; and the individualized auditory signal processing model is a signal processing neural network model trained to process the auditory input and emulate the degraded output of the hearing-impaired model, when connected to the input of the normal-hearing model.

In some preferred embodiments, a reference neural network that simulates augmented hearing perception and/or ability of a normal-hearing listener is used as the desired auditory response model; a corresponding normal-hearing or hearing-impaired neural network is used as the personalized auditory response model; and the individualized auditory signal processing model is a signal processing neural network model trained to process the auditory input and provide an augmented auditory response.

In some embodiments, the method comprises calibrating a subject's individual model of hearing damage by means of an OAE/AEP experiment. Experimentally recorded OAE and audiometric thresholds can be used to determine personalized OHC profiles. AEPs can be simulated for a range of synaptopathy profiles, i.e., for different degrees of ANF damage. Depending on the type of AEP, e.g., auditory brain stem response (ABR) or envelope-following response (EFR), a feature-set encompassing time-domain peaks and latencies, spectral magnitudes and relative metrics can be constructed for every simulated cochlear synaptopathy profile. Adopting clustering techniques, the CS profile which best matches the feature-set extracted from the measurements can be determined and the corresponding OHC- and ANF-damage parameters can be used to set the parameters of the NN-based individual auditory response model.

The above procedure can be further optimized by involving both OHC-loss and synaptopathy parameters to determine the best matching profile. This procedure includes more degrees of freedom and instead of pre-determining the OHC parameters before the determining the ANF profiles iteratively, all OHC and ANF related model parameters can now run iteratively to minimize the difference between the experimental and simulated feature-sets. In this way, OHC and ANF damage parameters of the NN-based auditory response model can be optimized simultaneously.

In some embodiments the subject auditory response model can be individualized on the basis on recorded biophysical data (e.g., individual parameters of ANS, ANF, OHC and/or IHC damage) from said subject to simulate the auditory peripheries of the individual listener. The skilled person may hereby appreciate that the individualized model as used herein is distinct from the personalized model. A personalized model will suit a subgroup of individuals, while an individualized model is directed at a single individual.

In particular, the personalized auditory response model refers to a NN-based model, for example obtained from a single measurement (e.g. audiogram to determine OHC damage) and/or by agglomerating data into a single model (hearing damage based on a combination e.g. OHC and/or IHC damage); whereas the individualized auditory response model refers to the individualization of all included NN-based models (e.g. individual contributions of ANS, ANF, OHC and/or IHC).

The above-described individualized subject auditory response model can provide the ability of using the closed-loop system to design individualized hearing-aid models that optimally compensate for the specific sensorineural hearing loss aspects of individual listeners, without taking into consideration perceptual constrains that are currently used in state-of-art hearing-aid algorithms (e.g., perceived loudness for gain prescriptions).

After determining the individual auditory profile of a listener, the corresponding parameters can be used to train a personalized NN-based auditory response model that captures the hearing damage of the listener's periphery at every different stage up to the level of auditory-nerve or brainstem/midbrain processing. Then, the individual auditory model is used in a closed-loop approach and its output is compared against the output of a 'reference' normal-hearing auditory model.

Neural network-based models in the present disclosure may consist of non-linear operations that make the auditory response difference differentiable. In some embodiments NN-based models may consist of highly non-linear but parallel operations. Because their operations are differentiable, this can enable the use of gradient-based optimization of parameters such as gradient descent in the model to accurately solve the problem. Hence differentiability is an intrinsic property of the present neural network-based model such that it can be trained to back-propagate to the solution that in other cases would be impossible to reach. For example, auditory models that are non-differentiable may have to resort to mathematical simplifications to reach the solution via e.g. gradient-free optimization, thereby reducing the solution accuracy.

Figure 5:
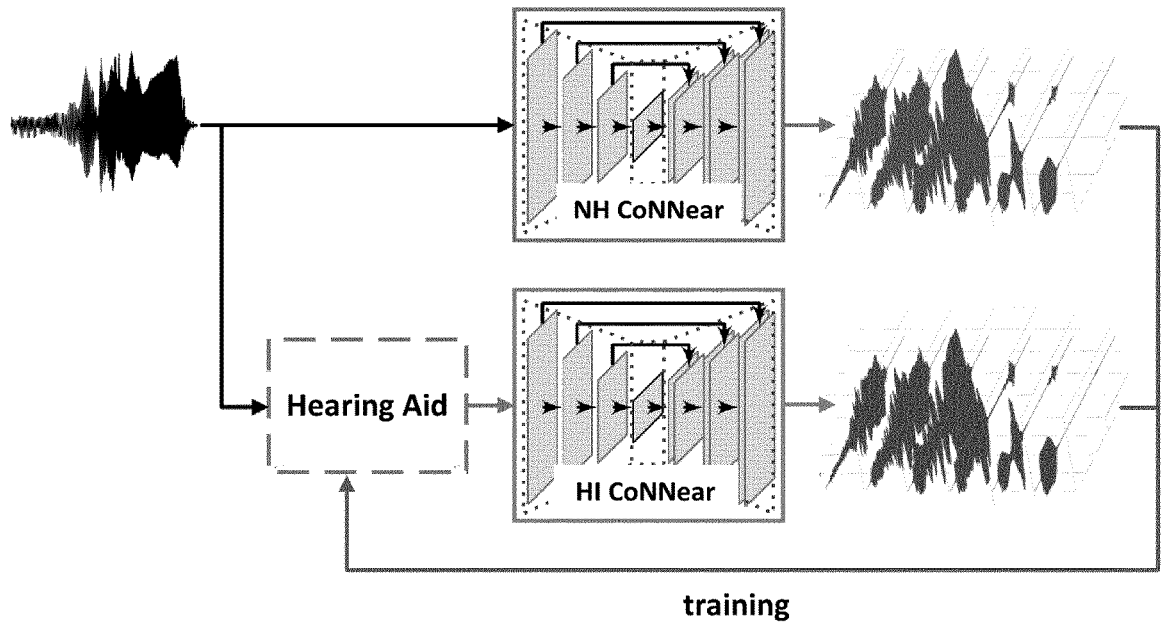
FIG. 5 illustrates a closed-loop approach for the design of a compensation-strategy for hearing-impairment according to some embodiments of the invention. In this example, simulation outcomes from a normal and hearing-impaired model are compared to inspire a signal-processing algorithm, which brings the hearing-impaired response closer to the normal-hearing response.

Therefore, through the provision of neural network-based models that consist of non-linear operations that make the auditory response difference differentiable, a closed-loop compensation approach can be designed using the two aforementioned auditory models where a 'hearing-aid' neural-network model is trained to process the auditory input and compensate for the degraded output of the individual hearing-impaired model (as illustrated in FIG. 5).

The closed-loop approach is made possible due to the differentiable character of the used auditory models. The outputs of these two models can provide a difference metric which can be used as a penalty/loss term to train the hearing-aid model. This metric is used to back-propagate through the NN-based auditory models and modify the weights of the hearing-aid model accordingly so it can train to minimize the specific metric in the best possible way. The hearing-aid model trains to process the auditory stimulus such as, when given as input to the hearing-impaired model, it can produce an output that can match (or partially match) the output of the 'reference' normal-hearing model.

The present also relates to an artificial neural network-based method for converting an auditory stimulus to a processed auditory output. The method preferably comprises the step of obtaining an individualized auditory signal processing model as described herein, or embodiments thereof; and, d. applying the individualized neural-network-based auditory signal processing model to the auditory stimulus to produce a processed auditory output, that preferably matches the desired auditory response, when given as an input to the personalized auditory response model or to the subject.

In some preferred embodiments, the individualized auditory signal processing model is trained to minimize a specific auditory response difference metric, such as the absolute or squared difference between the two auditory response models at several or all tonotopic frequencies.

In some embodiments, the difference between a desired auditory response and an auditory response is minimized using the absolute difference between the two models. In some embodiments, the difference between a desired auditory response and an auditory response is minimized using the squared differences between the two models.

In some embodiments, the difference between a desired auditory response and an auditory response is minimized, with the responses of the two models expressed in the frequency domain. In some embodiments, the difference between a desired auditory response and an auditory response is minimized, with the responses of the two models expressed in different frequency representations, such as a power or a magnitude spectrogram.

In some preferred embodiments, the difference of the summed auditory responses across a range of simulated frequencies is minimized. When used as inputs to models of brainstem and cortical processing, this allows optimal restoring of the generators of auditory evoked potentials.

In some preferred embodiments, the difference of auditory-nerve outputs of a normal-hearing and a hearing-impaired periphery is minimized; or the difference between simulated auditory brainstem and/or cortical responses, expressed in the time or frequency domain, is minimized.

The choice of optimization metric has an impact on the closed-loop compensation. The minimization of the difference between the outputs of the normal-hearing and hearing-impaired models, as used in some embodiments, might not be always desirable or even possible, considering the complexity of these representations. In some embodiments, it may be opted to train the personalized auditory signal processing model (in this example a hearing-aid model) to compensate for a single aspect of hearing damage (e.g. outer-hair-cell damage or synaptopathy) at several or all tonotopic frequencies. In some other embodiments, simulated cochlear responses are used as an input to models of brainstem and cortical processing such that additional auditory evoked potential features can be simulated and used to determine the parameters of the hearing-aid model. In some other embodiments, the hearing-aid model can be trained to optimally restore the generators of auditory evoked potentials, in which case summed cochlear responses across a range of simulated frequencies are used as inputs to models of brainstem and cortical processing to determine the parameters of the hearing-aid model.

In some other embodiments, the hearing-aid model is trained to process the auditory signal so that the 'reference' performance of normal-hearing subjects can be reached for a perceptual task such as speech intelligibility. In this case, a task-optimized speech 'back-end' is connected to the outputs of the normal-hearing and hearing-impaired cochlear models (i.e., 'front-ends') which will simulate the performance of listeners in different tasks. The outputs of the back-end can then be used to train a hearing-aid model which minimizes the difference between the hearing-impaired and normal-hearing performance. The front-end can be the cochlear model or the cochlear model connected to models of auditory brainstem/cortical processing. The task-optimized back-end can be a NN-based automatic-speech-recognition (ASR) system. In some embodiments, as a next step, noise or reverberation is introduced to the auditory signals to generalize the performance of these models in more realistic scenarios. In this case, a NN-based noise/reverberation suppression model can also be added as an intermediate step between the front-end and the back-end.

In some preferred embodiments, a task-optimized speech 'back-end' which simulates the performance of listeners in different tasks is connected to the outputs of the auditory response models, also referred to as 'front-ends'; and the outputs of the back-end are used to determine and minimize the auditory response difference.

In some embodiments, the auditory response model is trained to process the auditory signal so that the 'reference' performance of normal-hearing subjects can be reached for a perceptual task such as speech intelligibility.

In some embodiments, a task-optimized speech 'back-end' is connected to the outputs of the desired auditory response and simulated auditory response 'front-ends' which simulates the performance of listeners in different tasks.

In some embodiments, the outputs of the back-end are used to minimize the difference between the desired auditory response and simulated auditory response.

In some embodiments, the front-end is a cochlear model or a model of the whole auditory periphery.

In some embodiments, the task-optimized back-end is a NN-based automatic-speech-recognition (ASR) system.

In some embodiments, as a next step, noise or reverberation is introduced to the auditory signals to generalize the performance of these models in more realistic scenarios. In some embodiments, a NN-based noise/reverberation suppression model is added as an intermediate step between the front-end and the back-end.

In some embodiments, step d. comprises the step of:
suppressing the auditory stimulus when the amplitude of the input sound wave exceeds a generated maximum threshold.

In some embodiments, step d. comprises the step of:
enhancing the auditory stimulus when the amplitude of the input sound wave precedes a generated minimum threshold.

Once an individualized signal processing (for example hearing-aid) neural network is trained by the closed-loop approach, it may be used alone to process the auditory signal and compensate for the specific hearing loss. The neural-network can be implemented on a dedicated chip for parallel computations, integrated in a hearing-aid or possibly on a portable low-resource platform (e.g. raspberry pi). The signal processing model will preferably run in real-time, receiving the input via a sensor (e.g. microphone) and providing the processed output to an output device (e.g. earphones, in-ear inset) with a specific delay.

The individualized signal processing (for example hearing-aid) neural network is preferably trained to adjust the auditory signal in an optimal way, which may vary depending on the task, the auditory profile or the application. Preferably an auto-encoder architecture is used, which is based on convolutional filters and therefore processes the auditory signal in the time-domain, providing a processed output with the same representation.

Preferably, the individualized signal processing (for example hearing-aid) neural network architecture comprises a mirrored version of the encoder as the decoder. Such an architecture will provide the same output representation as the input representation, as mentioned above. However, different architectures could be used instead of an auto-encoder, to provide the input to the hearing-impaired model.

In some embodiments, step d. comprises the step of:
including an additional signal processing algorithm to adjust the audio stimulus.

In some embodiments, the additional signal-processing algorithm comprises filtering, onset sharpening, compressing, noise reduction, and/or expanding the audio stimulus.

In some embodiments, the additional signal processing model may comprise a noise/reverberation suppression stage, a word recognition stage, a frequency analysis or synthesis stage, to generalize for different acoustic scenarios and tasks.

In some embodiments, the individualized signal processing model provides a different output representation than the input representation, such as a cochleogram, a neurogram, or a different auditory feature map, depending on the desired input of the auditory response models.

In some embodiments, the individualized signal processing model provides an output representation that simulates the performance of listeners in different tasks, such as a speech intelligibility/recognition prediction or a speech quality assessment, depending on the desired input of the auditory response models.

In some preferred embodiments, (individualized and/or simulated) auditory responses to sound (e.g. auditory EEG responses such as AEP, sound perception, cochlear, ANF and brainstem processing) are used to adjust specific aspects of the sound stimulus in the time or frequency domain, preferably to adjust the intensity and/or temporal envelope shape (for example onset sharpening/envelope depth enhancement). The desired auditory responses to sound (e.g. normal-hearing or auditory feature enhanced responses) can be simulated or recorded. The difference between the desired auditory response and the auditory response corresponding to a subject's AN fiber and synapse integrity and/or OHC damage profile may then form a feedback loop to a processing unit of auditory devices. For example, the feedback loop can be used for optimizing the signal-processing algorithm to adjust the sound stimulation in these devices.

After developing an individualized hearing-aid NN model for a specific listener, the outputs of this model to specific stimuli could be simulated and the auditory responses of this listener (e.g. EEG responses such as AEP) could be measured using these processed stimuli instead. By comparing the measured responses of the processed stimuli to the measured responses to the original stimuli, the improvement of the signal-processing algorithms can be evaluated. The difference between the measured responses, when necessary, can be used for further optimizing the signal-processing algorithm.

In some embodiments, the efficiency of a trained individualized signal processing model can be evaluated on the individual, for example via AEP measurements, psycho-acoustic tasks (e.g. speech intelligibility, AM detection), or listening tests (e.g. MUSHRA). The outcomes of these tasks can demonstrate the improvement of the processed stimuli compared to the results for the unprocessed stimuli and can be also used to further optimize the signal processing models. In some preferred embodiments, the method is for configuring an auditory device, wherein the auditory device is a cochlear implant or a wearable hearing aid.

The present invention also relates to the use of the method as described herein, or embodiments, thereof in a hearing-aid application. Examples thereof are described herein. In some embodiments, the method is used in an invertible cochlear filter bank. An invertible cochlear filter bank allows to analyze one single input sequence to N output sequences and then re-synthesize these output sequences (by summing or combining in a more elaborate way) to create a single input sequence again. Such a filter bank also provides the ability to process the N output sequences in a more detailed, frequency-dependent way, in order to receive a processed input sequence. This is useful for hearing-aid applications, for example for outer-hair-cell and/or auditory-nerve damage compensation.

Therefore, in some embodiments the method comprises the step of:
analyzing one single input sequence to N output sequences and then re-synthesize these output sequences, for example by summing, to create a single input sequence again; and/or,
synthesizing N output sequences of a time-frequency representation, such as an auditory feature map, for example by summing, to create a single time-domain input sequence again.

The invention also relates to an auditory device, preferably a cochlear implant or wearable hearing aid, configured to perform the method as described in herein, and embodiments thereof.

The present invention also relates to an auditory device, preferably a cochlear implant or wearable hearing aid. The auditory device preferably comprises:
an input device disposed on the auditory device, the input device configured to pick up an input sound wave from the environment and convert the input sound wave to an auditory stimulus;
a processing unit, configured for performing the method as described herein, and embodiments thereof; and,
an output device disposed on the auditory device, the output device configured to produce the processed auditory output from the processor.

In some embodiments, the processed auditory output comprises sound waves. In some embodiments, the processed auditory output comprises an electrical signal. In some embodiments, the processed auditory output comprises deep-brain stimulation.

In some embodiments, the input device comprises a microphone.

In some embodiments, the processing unit is a processor, with a dedicated processor for parallel computations (e.g. GPU, VPU, AI-accelerator) being the best choice, since it can compute the output of the NN-based model much faster compared to a CPU.

The processing device may be a specially designed processing unit such as an ASIC, or may be a dedicated, energy-efficient machine learning hardware module, for instance a convolution accelerator chip, suitable for portable and embedded applications, e.g. battery-powered applications.

In some embodiments, the output device comprises at least one transducer.

In some embodiments, the output device is configured to provide audible time-varying pressure signals, basilar membrane vibrations, or corresponding auditory nerve stimuli associated with the at least one auditory stimulus, for example the transducer may be configured to convert output sequences generated by the neural network into audible time-varying pressure signals, basilar membrane vibrations, or corresponding auditory nerve stimuli associated with the at least one auditory stimulus.

The present invention also relates to a computer program, or a computer program product directly loadable into the internal memory of a computer, or a computer program product stored on a computer readable medium, or a combination of such computer programs or computer program products, configured for performing the method as described herein, or embodiments thereof.

Illustrated below is a preferred neural network-based model, herein referred to as the CoNNear model, to be used as one or more of the models in the methods as described herein.

Due to the differentiable character of the neural networks, any NN-based auditory model can be used in this closed-loop schematic, including the developed CoNNear model as illustrated below. However, no other NN-based model can describe the properties of the auditory periphery in such detail up to the level of the inner-hair-cell and auditory-nerve.

In some embodiments, the method comprises the steps of:
providing a multilayer convolutional encoder-decoder neural network including an encoder and a decoder, together comprising at least a plurality of successive convolutional layers, for example each comprising at least one convolutional layer, preferably each comprising at least a plurality of successive convolutional layers, successive convolutional layers of the encoder having strides, for example decreasing, constant, and/or increasing strides, preferably constant and/or increasing strides, with respect to an input to the neural network to sequentially compress the input and successive convolutional layers of the decoder having strides, for example decreasing, constant, and/or increasing strides, preferably constant and/or increasing strides with respect to the compressed input from the encoder to sequentially decompress the compressed input, each of the convolutional layer comprising a plurality of convolutional filters for convolution with an input to the convolutional layer to generate a corresponding plurality of activation maps as outputs, at least one nonlinear unit for applying a nonlinear transformation to the activation maps generated by at least one convolutional layer of the neural network, the nonlinear transformation mimicking a level-dependent cochlear filter tuning associated with cochlear processing, for example cochlear mechanics, basilar-membrane vibration, outer-hair-cell processing, inner-hair-cell processing, or auditory-nerve processing, and combinations thereof, for example cochlear mechanics and outer hair cells, one or more shortcut connections, preferably a plurality of shortcut connections, between the encoder and the decoder for forwarding inputs to a convolutional layer of the encoder directly to at least one convolutional layer of the decoder, an input layer for receiving inputs to the neural network, and an output layer for generating, for each input to the neural network, N output sequences of cochlear response parameters corresponding to N emulated cochlear filters associated with N different center frequencies to span a cochlear tonotopic place-frequency map, the cochlear response parameters of each output sequence being indicative of cochlear processing, for example cochlear mechanics, for example cochlear basilar-membrane vibration and/or inner-hair-cell and/or outer-hair-cell and/or auditory nerve responses, for example a place-dependent time-varying cochlear basilar membrane vibration and/or inner-hair cell receptor potential and/or outer-hair-cell responses and/or auditory nerve fiber firing patterns, for example a place-dependent time-varying vibration of a cochlear basilar membrane, providing at least one input sequence of predetermined length indicative of a time-sampled auditory stimulus, and applying the at least one input sequence to the input layer of the neural network to obtain the N output sequences of cochlear response parameters, and optionally, summing or combining, preferably summing, the obtained N output sequences to generate a single output sequence of cochlear response parameters.

In some embodiments, the nonlinear unit applies the nonlinear transformation as an element-wise nonlinear transformation, preferably a hyperbolic tangent.

In some embodiments, a number of convolutional layers of the encoder equals a number of convolutional layers of the decoder.

In some embodiments the neural network comprises shortcut connections between each convolutional layer of the encoder and a corresponding one convolutional layer of the decoder.

In some embodiments, the neural network comprises shortcut connections between the first of the successive convolutional layers of the encoder and the last of the successive convolutional layers of the decoder.

In some embodiments, the stride for the successive convolutional layers of the encoder with respect to the input to the neural network is equal to the stride for the successive convolutional layers of the decoder with respect to the compressed input, thereby matching each convolutional layer of the encoder with a corresponding one convolutional layer of the decoder to transpose a convolution operation of the convolutional layer of the encoder.

In some embodiments, a number of samples for the at least one input sequence equals a number of cochlear response parameters in each output sequence.

In some embodiments, the neural network comprises a plurality of nonlinear units for applying a nonlinear transformation to the activation maps generated by each convolutional layer of the neural network.

In some embodiments, at least one input sequence comprises a pre-context and/or a post-context portion, respectively preceding and/or succeeding a plurality of input samples indicative of the auditory stimulus, and wherein the method further comprises cropping each of the generated output sequences to contain a number of cochlear response parameters that is equal to a number of input samples of the plurality of input samples indicative of the auditory stimulus.

In some embodiments, the method comprises:
providing a training dataset comprising a plurality of training input sequences, each comprising a plurality of input samples indicative of a time-sampled auditory stimulus, providing a biophysically accurate validation model for cochlear processing, preferably a cochlear transmission line model, a degree of accuracy of which is evaluated with respect to experimentally measured cochlear response parameters indicative of cochlear processing, for example cochlear mechanics, for example cochlear basilar-membrane vibration and/or inner-hair-cell and/or outer-hair-cell and/or auditory nerve responses, for example a place-dependent time-varying cochlear basilar membrane vibration and/or inner-hair cell receptor potential and/or outer-hair-cell responses and/or auditory nerve fiber firing patterns, for example place-dependent time-varying basilar membrane vibrations in accordance with a cochlear tonotopic place-frequency map, generating N training output sequences for each training input sequence, each of the N training output sequences being associated with a different center frequency of the cochlear tonotopy map, performing the emulation method using training input sequences to generate corresponding emulated sequences of cochlear response parameters for the neural network with respect to the same cochlear tonotopy map, and evaluating a deviation between the emulated sequences and the training output sequences arranged as training pairs, the emulated sequence and the training output sequence of each training pair being associated with a same training sequence, using an error backpropagation method for updating the neural network weight parameters comprising weight parameters associated with each convolutional filter, optionally, retraining the neural network weight parameters for a different set of neural network hyperparameters to further reduce the deviation, the different set of neural network hyperparameters including one or more of: a different nonlinear transformation applied by the at least one nonlinear unit, a different number of convolutional layers in the encoder and/or decoder, a different number of convolutional filters in any one convolutional layer of the neural network, a different length as the predetermined length for the input sequence, a different configuration of shortcut connections, or optionally a different size of the convolutional filters in any one convolutional layer of the neural network.

In some embodiments, the method further comprises the steps of providing a modified validation model reflecting cochlear processing subject to a hearing impairment, and retraining the neural network weight parameters for the modified validation model or a combination of the validation model and the modified validation model.

In some embodiments, the auditory device comprises:
a pressure detection means for detecting a time-varying pressure signal indicative of at least one auditory stimulus; and/or a sensor that detects human bio-signals, for example an EEG sensor, or a pressure sensor such as an ear-canal pressure sensor,
sampling means for sampling the detected auditory stimulus to obtain an input sequence comprising a plurality of input samples, and
at least one transducer for converting output sequences generated by the neural network into audible time-varying pressure signals, cochlear responses; for example, basilar-membrane vibrations, inner-hair-cell responses, outer-hair-cell responses, auditory-nerve responses, or corresponding auditory-nerve responses, and combinations thereof, for example basilar membrane vibrations; or corresponding auditory nerve stimuli associated with the at least one auditory stimulus.

EXAMPLES

Example 1: Method for Determining the Integrity of AN Fibers and Synapses of a Subject A possible model for determining the integrity of auditory nerve fibers and synapses of a subject according to a preferred embodiment of the present invention is discussed with reference to FIG. 1, which presents a flow-chart of the preferred steps for determining an ANF integrity profile and optionally using reference data to determine a subject specific auditory profile. The recording is compared to that of a normative dataset of "normal" people with normal ANF. By comparing the reference to the subject, a subject-specific auditory profile can be obtained.

(100) is an auditory stimulus (e.g. a sound) that evokes an auditory response across a population of AN fibers and synapses along the cochlea. The stimulus can be used for the AEP recording to diagnose ANF damage. The stimulus characteristics can be designed to target a limited or broad frequency range of hearing. In a preferred embodiment, the auditory stimulus may be a carrier signal c(t) (e.g. broadband noise or pure tone) which is amplitude modulated by a periodic modulator with a non-sinusoidal (rectangular) waveform m(t).

(200) is a biophysical model of the signal processing of the auditory periphery, (which preferably includes a numerical description of cochlear mechanics, outer- and inner-hair cells functionality as well as represents the firing rates of AN synapses and firing). The model may include data from, e.g., simulated and/or experimental frequency and/or type-specific ANF damage profiles (210). The ANF (210) damage profiles could be determined based on experimental data (e.g. AEP recording). The ANF data may be subdivided based on a subset of the ANF population; this may include high spontaneous rate fibers (HSR), medium spontaneous rate fibers (HSR), and low spontaneous rate fibers (LSR), and/or these fiber subtypes in selected hearing frequency ranges.

(300) responses for the whole or a subset of the ANF population may be simulated to obtain a predicted auditory response to the auditory stimulus. This auditory response can be a simulated auditory EEG response such as AEP, simulated auditory sound perception and/or simulated cochlear, ANF and brainstem processing). Calculation of the response magnitudes (from the simulations) of EEG responses to the present or different stimuli may allow to create various auditory responses corresponding to the different ANF profiles or other input parameters. The auditory responses may be further subdivided using category-based parameters, based on e.g. age, sex, etc., or other parameters. The calculated auditory responses and corresponding ANF damage profiles may be stored on or made available through a database.

(400) The subject's EEG response to the present auditory stimulus (100) may be experimentally measured using an EEG set-up. Processing of the EEG data allows for calculating the subject specific EEG response amplitudes to said stimulus.

(500) the processed subject's EEG response data may be interpreted using the predictive simulation data (300) to assign the subject to an auditory profile. The assigning can be performed automatically by means of a matching algorithm (500). The assigned profile is preferably based on the best possible match between the simulated and recorded EEG response amplitudes. Based on the assigned auditory profile, the integrity of the subject's AN fibers and synapses may be determined. For example, in the present figure the subject is assigned an ANF profile characterized by a 54% HSR, 0% MSR and 0% LSR damage profile. Because the best-matching ANF profile did not return 100% ANF types in all ANF categories, this subject has a degree of cochlear synaptopathy.

Example 2: Method for Determining the Outer-Hair Cell (OHC) Damage of a Subject

Figure 2:
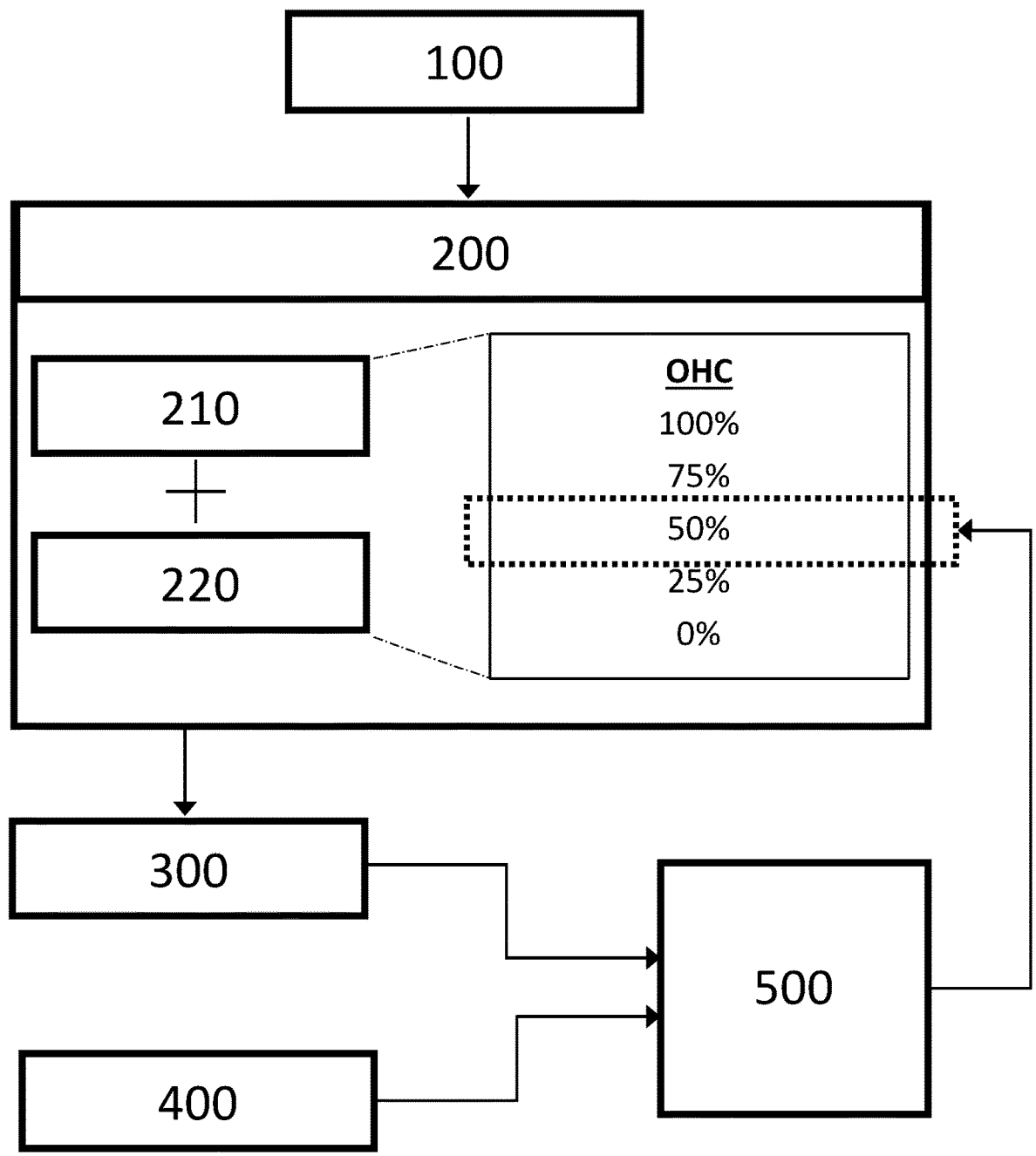
FIG. 2 presents a flow-chart of the preferred steps for determining an ANS/ANF and OHC profile, and optionally using reference data to determine a subject specific auditory profile. Such a profile can be used in a method according to some embodiments of the invention.

Further to the above-described Example 1, a possible method for determining the AN fiber and synapse integrity of a subject may be expanded to also determine the outer-hair cell (OHC) damage of said subject. The method is described with reference to FIG. 2, which presents a flow-chart of the preferred steps for determining an individual ANF and OHC damage profile and optionally using subject data to determine a subject-specific auditory profile.

In particular, the biophysical model of the auditory periphery (200) may be expanded to also include, e.g., simulated and/or experimental frequency-specific OHC damage profiles (220). The OHC damage profiles (220) could be determined based on experimental data of frequency-specific hearing loss (e.g. from audiogram test, otoacoustic emissions). Alternatively, the OHC damage profiles (220) could be kept variable such that the matching algorithm (500), which finds the best subject match, can be optimized both for AN and OHC profiles simultaneously. For example, in the present figure the subject is assigned an OHC profile characterized by 50% OHC damage, based on the subject's experimental AEP recordings and the best match with a specific simulated auditory response to the same stimulus within a database of simulated auditory responses to a number of auditory profiles (including ANF and OHC damage). The subject in the illustration was determined to have a degree of OHC related hearing loss.

Figure 3:
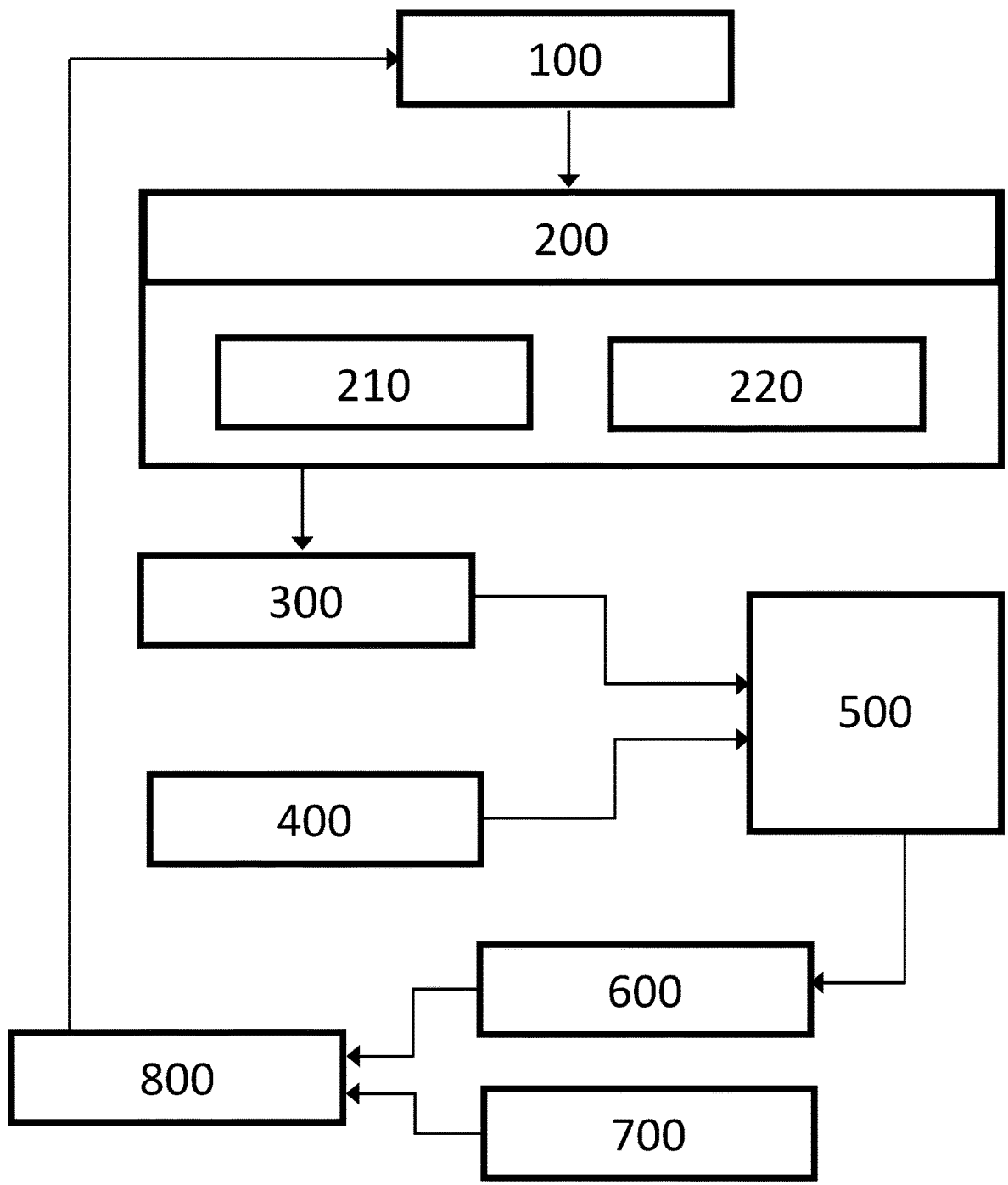
FIG. 3 presents a flow chart of the preferred steps for determining a desired auditory response. The determined auditory response may be used for configuring auditory devices, such as cochlear implants or hearing aids. Such an auditory response can be used in a method according to some embodiments of the invention.

Example 3: Method for Modifying the Desired Auditory Responses to Sound for a Subject Further to the above-described Examples, the method(s) for determining the integrity of ANFs/ANSs and/or OHC damage of a subject may be used to modify the desired auditory responses to sound for said subject according to an embodiment of the invention. The method is described with reference to FIG. 3, which presents a flow chart of the preferred steps for determining a signal-processing algorithm (600) which is used to modify the auditory stimulus which yields the desired auditory response. The determined signal-processing algorithm may be used for configuring auditory devices, such as cochlear implants or hearing aids.

Captured (personalized) auditory responses to sound (e.g. auditory EEG responses such as AEP, sound perception, cochlear, ANF and brainstem processing, 400) can be used to determine the subject specific ANF and OHC damage auditory profile (500). This auditory profile can be included in an auditory periphery model to simulate auditory responses to any acoustic stimulus (600). The individually simulated auditory response can be compared to a desired auditory response (700). The desired response may be experimental or simulated and could for example be the response from a normal-hearing subject or be a response with enhanced features. A signal-processing algorithm (800) is afterwards included to adjust the sound stimulus in such a way that the simulated auditory response (600) matches the desired auditory response (700). For example, this matching algorithm (800) may end up filtering, onset sharpening, compressing and/or expanding the audio stimulus (100).

Example 4: Training a Hearing-Aid Neural Network

FIG. 5 illustrates an example of an embodiment of the present invention. In this example, using a 'reference' neural network that can describe a normal-hearing auditory periphery and a corresponding hearing-impaired neural network, a 'hearing-aid' neural-network model can be trained to process the auditory input and compensate for the degraded output of the hearing-impaired model.

This individual 'hearing-aid' model will produce a signal that can match (or partially match) the output of a specific hearing-impaired cochlea to the output of the 'reference' normal-hearing cochlea. In this example, the hearing-aid model is trained to minimize a specific metric, such as the absolute or squared difference between the two other models, or more complex metrics that are indicative of the degraded hearing ability. Once the exact auditory profile of hearing loss is estimated for an individual, an individualized hearing-aid model can be developed that can accurately compensate for the specific hearing-impairment.

Figure 6:
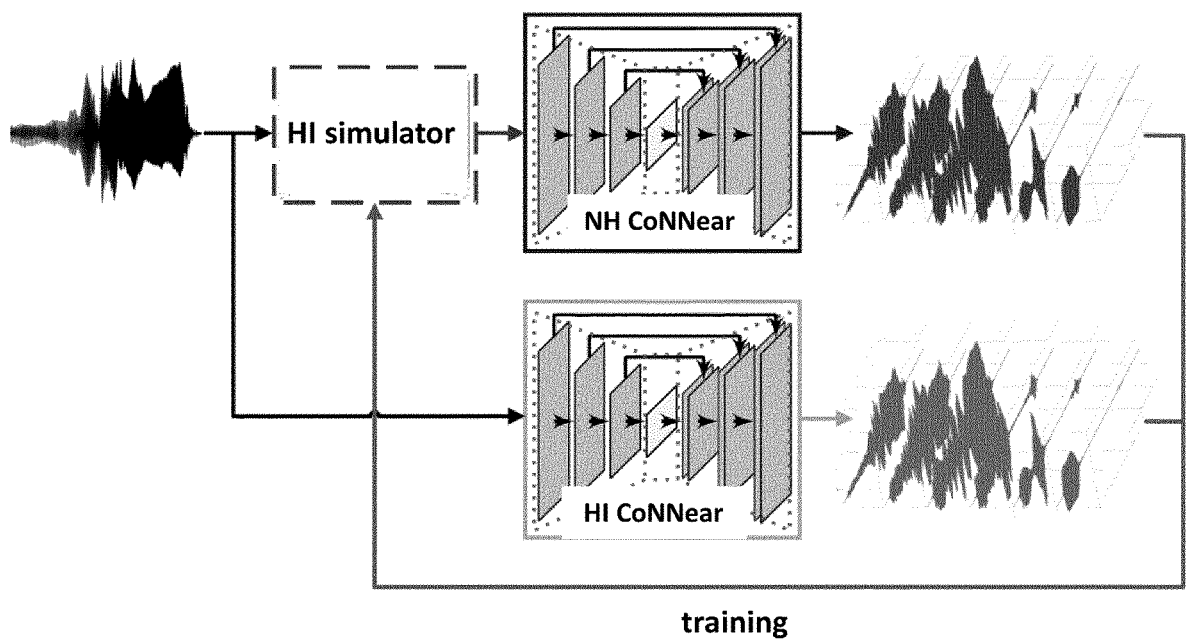
FIG. 6 illustrates a closed-loop approach for the design of a simulator of hearing-impairment according to an embodiment of the invention. In this example, simulation outcomes from a normal and hearing-impaired model are compared to inspire a signal-processing algorithm which provides a signal that can emulate the hearing perception of a listener with such a periphery.

In a different embodiment, the hearing-impaired neural network can be used as the 'reference' model and its auditory input can be processed by a 'hearing-impairment' neural network instead, which will be trained to 'degrade' the output of the normal-hearing model to match the 'reference' hearing-impaired model. This will provide a processed audio stimulus which, when played back to a normal-hearing listener, will emulate the degradation of hearing experienced by a respective hearing-impaired listener with a corresponding periphery, as illustrated in FIG. 6.

Example 5: Adapting Outputs at Different Stages of the Auditory Periphery Model

Figure 4:
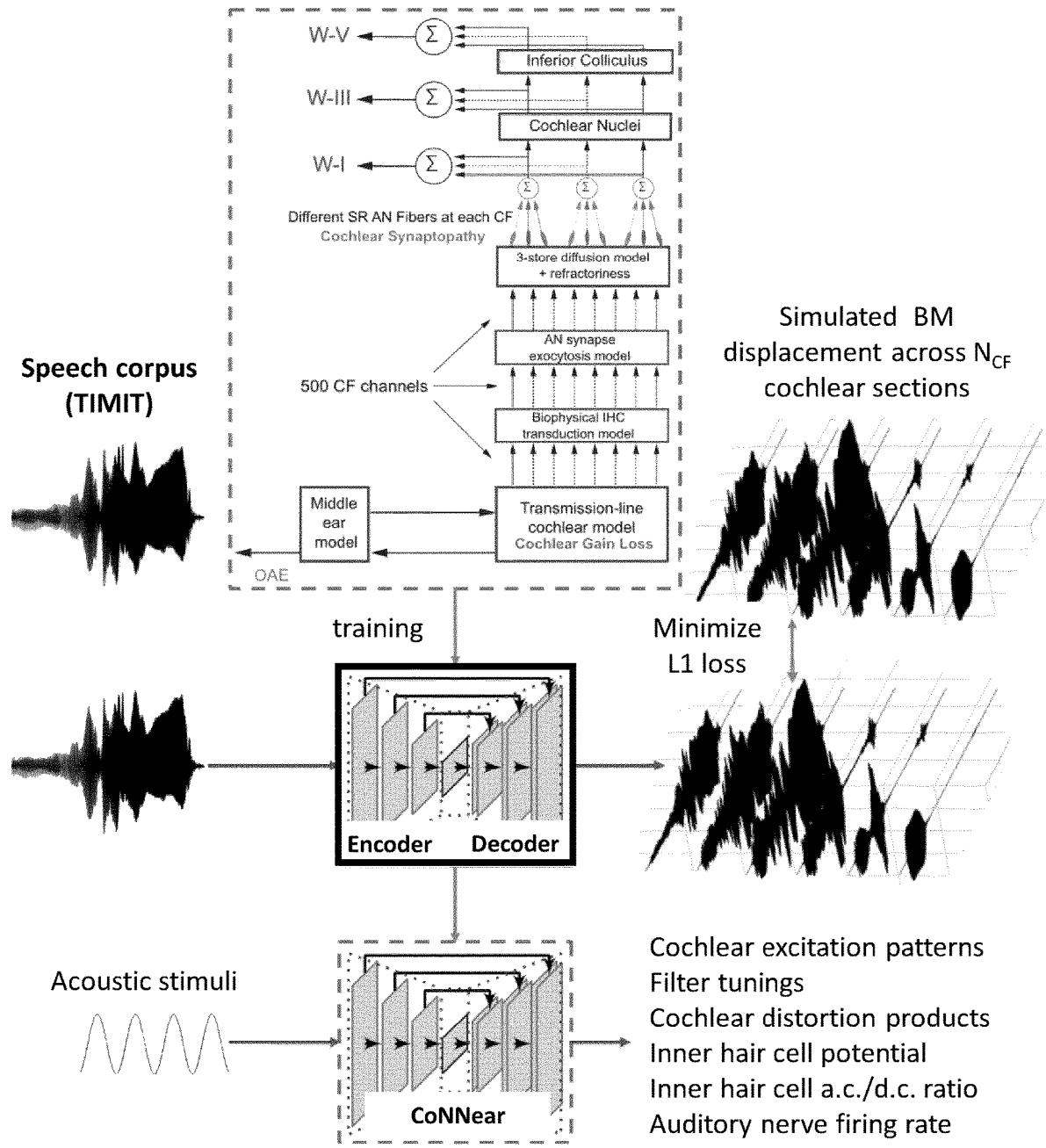
FIG. 4 illustrates the approach to extract, approximate, train and evaluate the outputs of the different stages of the auditory periphery model, which can be used in a method according to some embodiments of the invention.

FIG. 4 illustrates the approach to extract, approximate, train and evaluate the outputs of the different stages of the auditory periphery model according to an embodiment of the invention. The top dashed box shows all the elements included in a model of the auditory periphery which includes analytical descriptions of middle-ear, cochlear BM vibration, inner-hair-cell, auditory nerve, and cochlear nucleus, inferior colliculus processing. Simulated outputs of the above named processing stages (either for all simulated CFs or as a sum over a number of CFs) can be used to train different processing stages of the CoNNear model. An example is shown here where the TL-model BM vibration outputs to a speech corpus are used to train the BM vibration CoNNear model. During training, the L1 loss between the simulated CoNNear output and TL-model output is used to determine the CoNNear parameters. After training, the performance of the resulting CoNNear model is evaluated using basic acoustic stimuli which were not presented during training and are often used in auditory neuroscience and hearing research.

Figure 7:
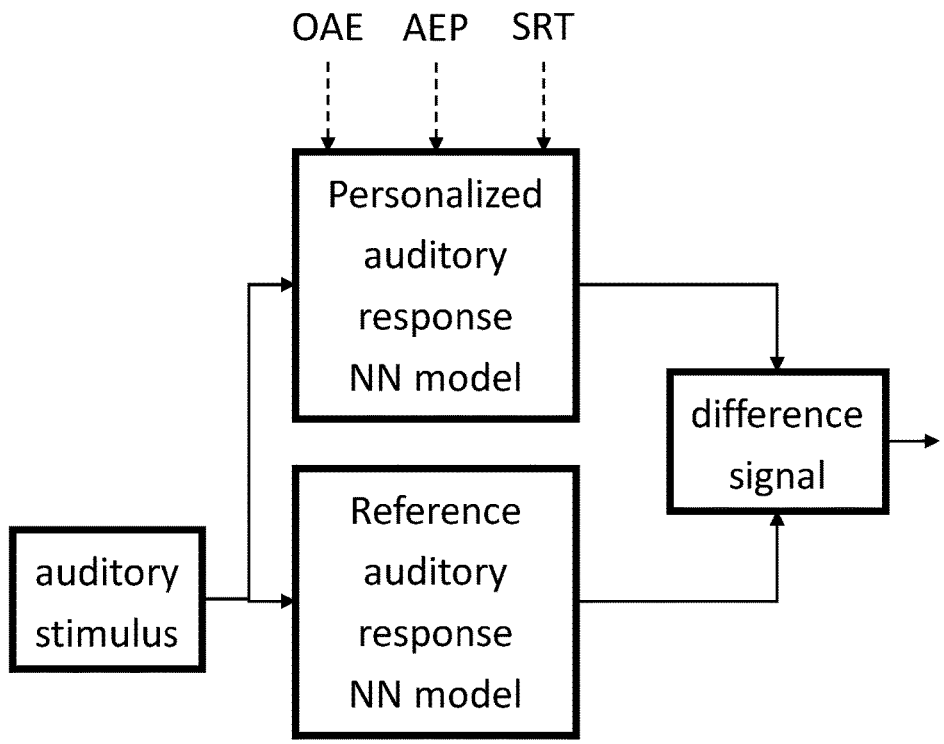
FIG. 7 illustrates the use of a personalized auditory response model and a reference auditory response model to generate a difference signal, based on the difference of their outputs. The auditory response models can be models of the auditory periphery or ASR systems or any NN-based auditory model. The individualized auditory model can be fitted to an individual subject using different sensors and measured data, including experimental data of OAEs, AEPs, or the performance in psychoacoustic tasks such as the speech-reception-threshold (SRT). By using NN-based auditory models, the difference signal can be differentiated and thus used to back-propagate through these models.

Example 6: Generating the Difference Signal and Training a Signal Processing Model FIG. 7 illustrates the use of a personalized auditory response model and a reference auditory response model to generate a difference signal, based on the difference of their outputs. The auditory response models can be models of the auditory periphery or ASR systems or anything. The individualized auditory model can be fitted to an individual subject using different sensors and measured data, including experimental data of OAEs, AEPs, or the performance in psychoacoustic tasks such as the speech-reception-threshold (SRT). By using NN-based auditory models, the difference signal can be differentiated and thus used to back-propagate through these models.

Figure 8:
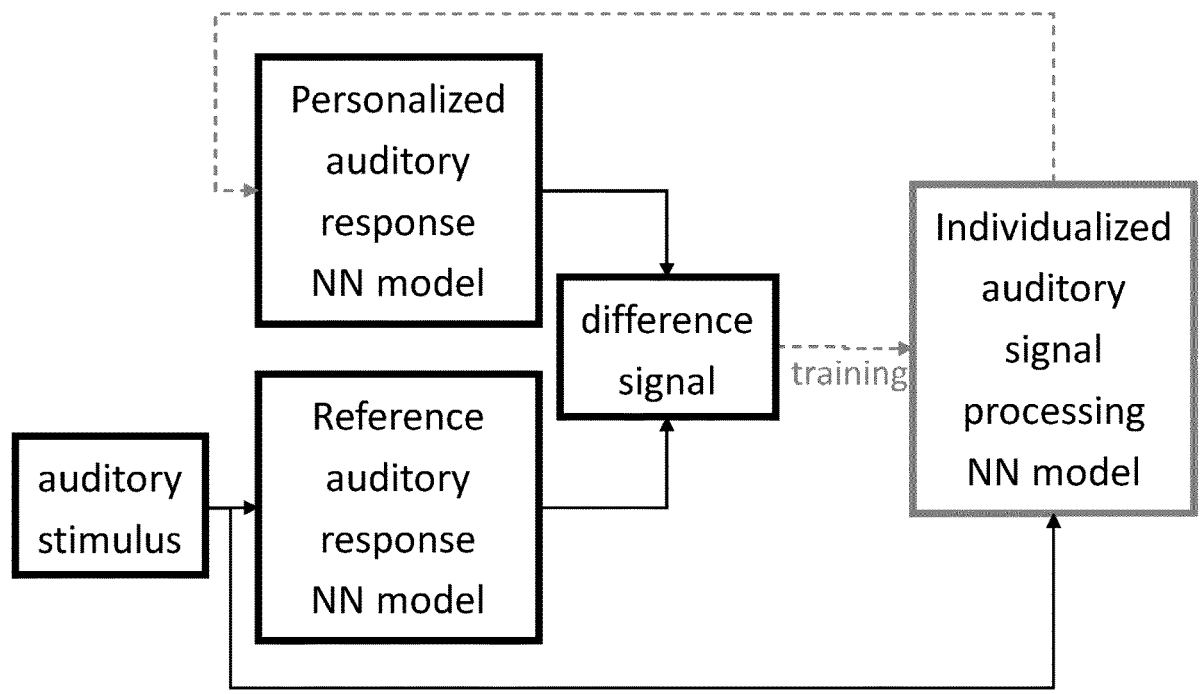
FIG. 8 illustrates the use of the aforementioned difference signal as a loss function for the training of an individualized NN-based auditory signal processing model. During training, the output of the processing model will be given as input to the personalized auditory response model and its parameters adjusted to minimize the difference signal. After successful training, the NN-based auditory processing model can be used directly to process the auditory stimulus and produce a processed output fit to the individualized response model or a human listener.

FIG. 8 illustrates the use of the aforementioned difference signal as a loss function for the training of an individualized NN-based auditory signal processing model. During training, the output of the processing model is given as input to the individualized response model and its parameters are adjusted to minimize the difference signal. After successful training, the NN-based auditory processing model can be used directly to process the auditory stimulus and produce a processed output fit to the individualized response model or a human listener.

Example 7: Training a Signal Processing Model to Match a Desired Performance

Figure 9:
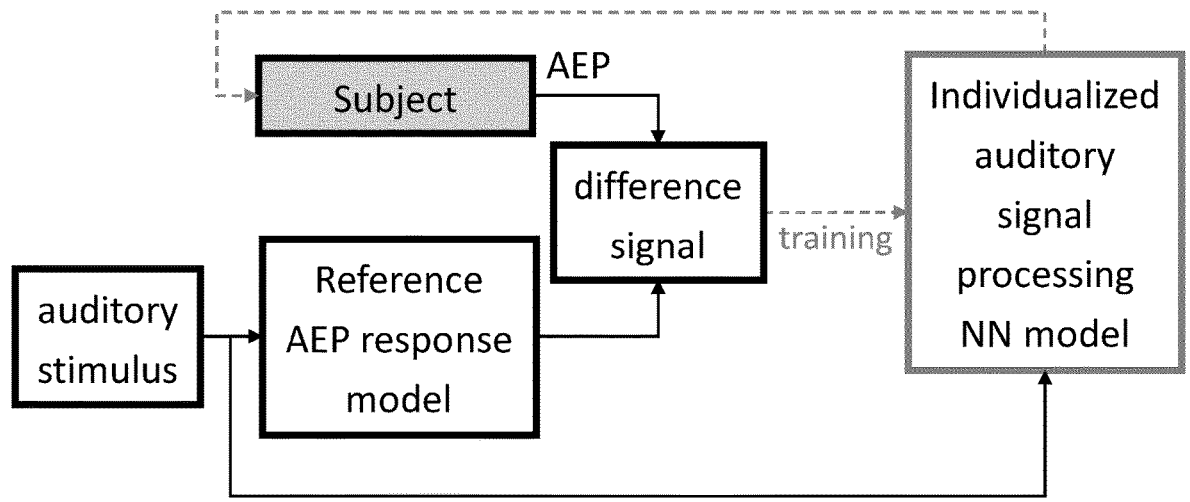
FIG. 9 illustrates a real-time optimization of a pre-trained individualized auditory signal processing model fit to a specific subject. In this schematic, the AEP response of a subject for the processed stimulus is collected via a sensor and compared against the simulated AEP response of a reference auditory model output for the unprocessed stimulus. The weights of the processing model are adapted on the fly, so that the measured AEP response is optimized to better match the reference AEP response.

FIG. 9 illustrates a real-time optimization of a pre-trained individualized auditory signal processing model fit to a specific subject. In this schematic, the AEP response of a subject for the processed stimulus is collected via a sensor and compared against the simulated AEP response of a reference auditory model output for the unprocessed stimulus. The weights of the processing model are adapted on the fly, so that the measured AEP response is optimized to better match the reference AEP response.

Figure 10:
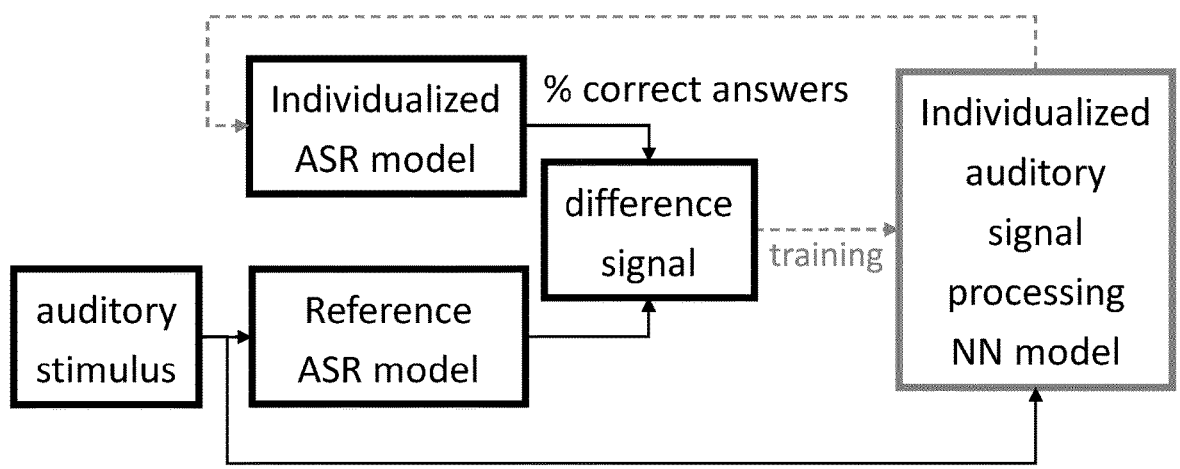
FIG. 10 illustrates the use of NN-based ASR models for the auditory response models. The individualized ASR model can be a hearing-impaired ASR model or a combination of a simple ASR back-end with a hearing-impaired front-end.

FIG. 10 illustrates the use of NN-based ASR models for the auditory response models. The individualized ASR model can be a hearing-impaired ASR model or a combination of a simple ASR back-end with a hearing-impaired front-end. The difference of the predicted outputs is computed, i.e. the difference of the percentage of correct answers predicted by the two models, and this difference is used to train an individualized auditory signal processing NN model. The successfully trained processing model will process the auditory stimulus in such a way that the predicted performance of the individualized ASR model can reach the performance of the reference model. If the individualized ASR system can accurately predict the performance of a listener with the simulated auditory periphery, then this would lead to a similar improvement of performance for the listener in the same task.

In the same way, if a normal-hearing ASR is used as the individualized model and an ASR with enhanced features is used as the reference model (e.g. a model that can correctly recognize sentences at low SNRs), then the processing model will be trained to process the stimulus so that an increased/augmented performance can be achieved for the ASR system.

Example 8: Exemplary Implementation of a Preferred Neural Network-Based Model

Figure 11:
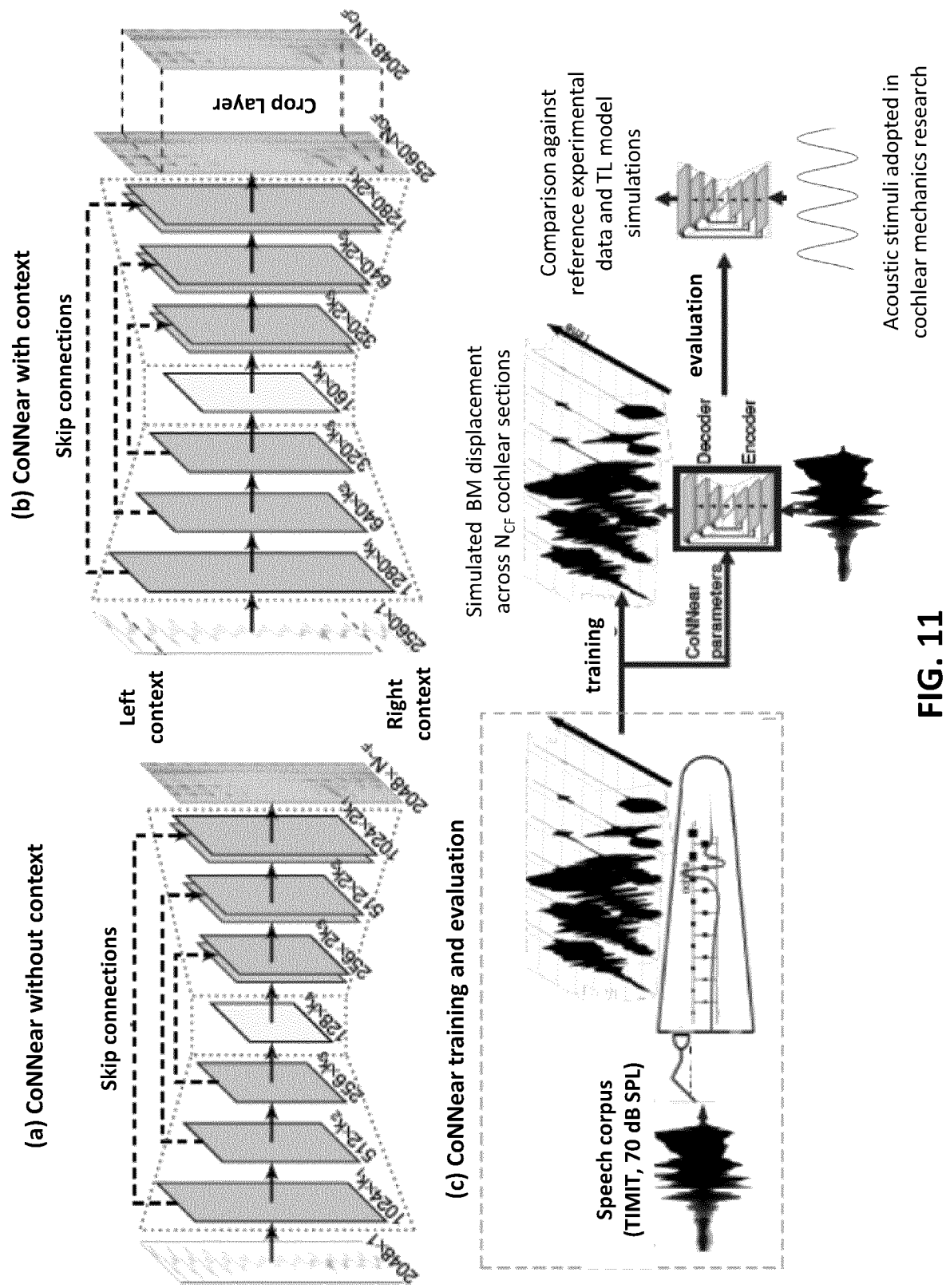
FIG. 11 illustrates an implementation of a preferred neural network-based model referred to as "CoNNear", which is a fully convolutional encoder-decoder neural network with strided convolutions and skip-connections to map audio input to 201 basilar-membrane vibration outputs of different cochlear sections ($N_{CF}$) in the time-domain. CoN Near architectures with (a) and without (b) context are shown. The final CoNNear model has four encoder and decoder layers, uses context and includes a tanh activation function between the CNN layers. (c) provides an overview of the model training and evaluation procedure. Whereas reference, analytical TL-model simulations to a speech corpus were used to train the CoNNear parameters, evaluation of the model was performed using simple acoustic stimuli commonly adopted in cochlear mechanics studies.

With reference to FIG. 11, an implementation of a preferred neural network-based model is discussed. This model is herein referred to as the CoNNear model.

The CoNNear model has an auto-encoder CNN architecture and transforms a 20-kHz sampled acoustic waveform (in [Pa]) to NCF cochlear BM displacement waveforms (in [μm]) using several CNN layers and dimension changes. The first four layers are encoder layers and use strided convolutions to halve the temporal dimension after every CNN layer. The following four are decoder layers that map the condensed representation onto L×NCF outputs using deconvolution operations. L corresponds to the initial size of the audio input and NCF to 201 cochlear filters with centre frequencies (CFs) between 0.1 and 12 kHz. The adopted CFs were spaced according to the Greenwood place-frequency map of the cochlea and span the most sensitive frequency range of human hearing. It is important to preserve the temporal alignment (or, phase) of the inputs across the architecture, because this information is essential for speech perception.

U-shaped skip connections were used for this purpose. Skip connections have earlier been adopted in image-to-image translation and speech-enhancement applications; they pass temporal information directly from encoder to decoder layers (FIG. 11a; dashed arrows).

Aside from preserving phase information, skip connections may also improve the model's ability to learn how best to combine the nonlinearities of several CNN layers to simulate the level-dependent properties of human cochlear processing.

Every CNN layer is comprised of a set of filterbanks followed by a nonlinear operation and the CNN filter weights were trained using TL-simulated BM displacements from NCF cochlear channels. While training was conducted using a speech corpus presented at 70 dB SPL, model evaluation was based on the ability to reproduce key cochlear mechanical properties using basic acoustic stimuli (e.g. clicks, pure-tones) unseen during training (FIG. 11c).

During training and evaluation, the audio input was segmented into 2048-sample windows (100 ms), after which the corresponding BM displacements were simulated and concatenated over time. Because CoNNear treats each input independently, and resets its adaptation properties at the start of each simulation, this concatenation procedure could result in discontinuities near the window boundaries. To address this issue, we also evaluated an architecture that had the previous and following (256) input samples available as context (FIG. 11b). Different from the no-context architecture (FIG. 11a), a final cropping layer was added to remove the simulated context and yield the final L-sized BM displacement waveforms.

Lastly, training CoNNear using audio inputs of fixed duration does not prevent it from handling inputs of other durations after training, thanks to its convolutional architecture. This flexibility is a clear benefit over matrix-multiplication-based neural network architectures, which can operate only on inputs of fixed-duration.

Figure 12:
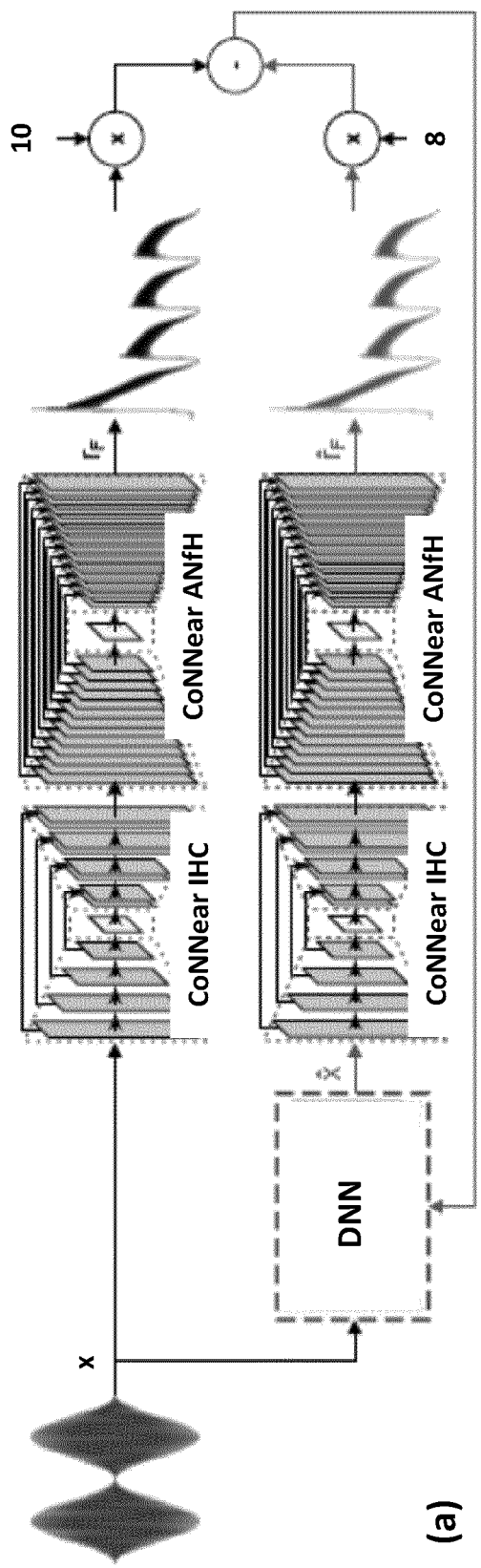
FIG. 12 illustrates the training of an audio-signal processing DNN model using CoNNear outputs. (a) The audio-signal processing DNN model is trained to minimise the difference of the outputs of the two CoN Near IHC-ANF models (orange pathway). (b) When processed by the trained DNN model, the input stimulus results to a firing rate output for the second model that closely matches the firing rate of the first model.
Figure 12:
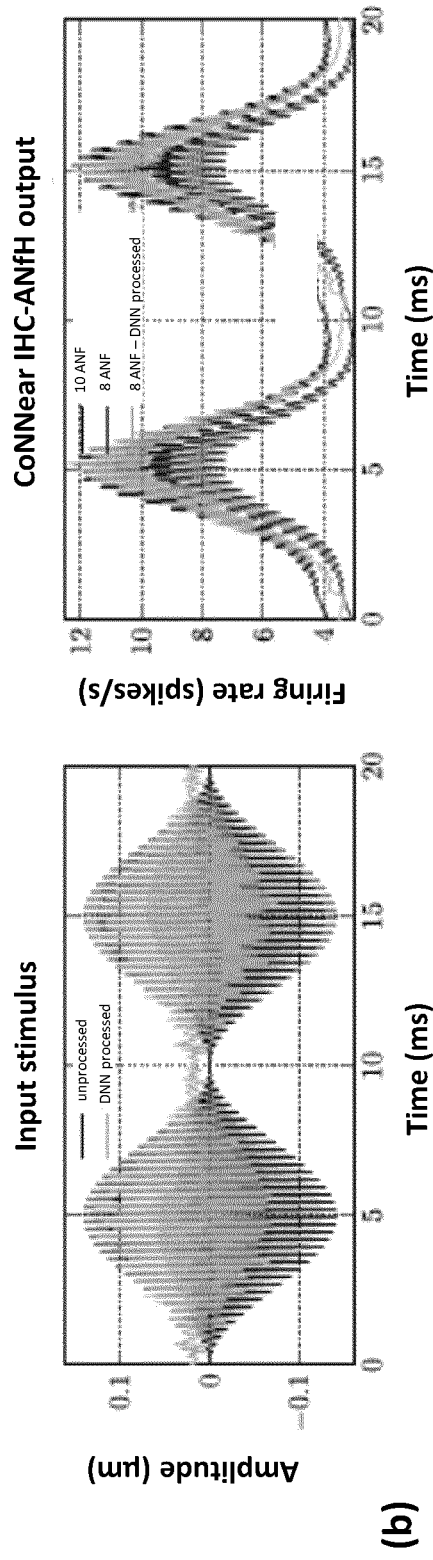

Example 9: Training of a Preferred Neural Network-Based Neural Network Model on Normal and Pathological Models With reference to FIG. 12, an example is discussed wherein a Deep Neural Network (DNN) model was trained to minimise the difference between the outputs of two IHC-ANF models: a normal and pathological model. Each model comprised the CoNNearIHC and CoNNearANfH modules, and the firing rates of each model were multiplied by a factor of 10 and 8 respectively, to simulate innervations of a normal-hearing human IHC at 4 kHz), and a pathological IHC that has a 20% fiber deafferentation due to cochlear synaptopathy.

The DNN model was trained based on the responses of these two CoNNear models to modify the stimulus such to restore the output of the pathological model back to the normal-hearing model output. FIG. 12(a) shows that the training was done using a small input dataset of 4 kHz tones with different levels and modulation depths, normalised to the amplitude ranges of IHC inputs, and the DNN model was trained to minimise the L1 loss between the time and frequency representations of the outputs.

After training, the DNN model provides a processed input to the 8-fiber model to generate an output that matches the normal-hearing firing rate as much as possible. The result for a modulated tone stimulus is shown in FIG. 12(b), for which the amplitude of the 8-fiber model response is restored to that of the normal-hearing IHC-ANF. This example demonstrates the backpropagation capabilities of our CNN models and their application range can be extended to more complex datasets such as a speech corpus, to derive suitable signal-processing strategies for speech processing restoration in hearing-impaired cochleae.

The invention claimed is:

1. An artificial neural network-based method for converting an auditory stimulus to a processed auditory output, the method comprising the steps of:
   a. generating a neural network-based personalized auditory response model based at least on the integrity of auditory nerve fibers, auditory nerve synapses or a combination of auditory nerve fibers and auditory nerve synapses in a subject, said personalized auditory response model representing an expected auditory response of said subject with an auditory profile to the auditory stimulus;
   b. comparing the output of the personalized auditory response model with the output of a neural network-based desired auditory response model to determine an auditory response difference; wherein said neural network-based models consist of non-linear operations that make the auditory response difference differentiable;

c. using the determined differentiable auditory response difference to develop a neural network-based individualized auditory signal processing model of the subject, wherein the individualized auditory signal processing model is configured to minimize the determined auditory response difference; and, d. applying the individualized neural-network-based auditory signal processing model to the auditory stimulus to produce a processed auditory output that matches the desired auditory response, when given as an input to the personalized auditory response model or to the subject.

2. The method of claim 1, wherein the personalized auditory response model of step a. is determined by deriving and including a subject specific auditory profile or wherein the subject specific auditory profile is a subject specific auditory damage profile.

3. The method of claim 1, wherein the desired auditory response is the response from a normal-hearing subject or a response with enhanced features.

4. The method of claim 1, wherein the desired auditory response model and the personalized auditory response model comprise models of different stages of the auditory periphery.

5. The method of claim 1, wherein a reference neural network that describes a normal-hearing auditory periphery is used as the desired auditory response model; wherein a corresponding hearing-impaired neural network is used as the personalized auditory response model; and wherein the individualized auditory signal processing model is a signal processing neural network model trained to process the auditory input and compensate for the degraded output of the hearing-impaired model, when connected to the input of the hearing-impaired model or the subject.

6. The method of claim 1, wherein a reference neural network that simulates augmented hearing perception and/or ability of a normal-hearing listener is used as the desired auditory response model; wherein a corresponding normal-hearing or hearing-impaired neural network is used as the personalized auditory response model; and wherein the individualized auditory signal processing model is a signal processing neural network model trained to process the auditory input and provide an augmented auditory response.

7. The method of claim 1, wherein the individualized auditory signal processing model is trained to minimize a specific auditory response difference metric, such as the absolute or squared difference between the two auditory response models at several or all tonotopic frequencies.

8. The method of claim 1, wherein the processed auditory output is selected from a modified auditory stimulus which is devised to compensate for a hearing-impairment or yields augmented hearing.

9. The method of claim 1, wherein the processed auditory output is selected from a modified auditory response corresponding to a specific processing stage along the auditory pathway, which can for example be used to stimulate auditory prostheses such as cochlear implants or deep brain implants.

10. The method of claim 1, wherein the difference of auditory-nerve outputs of a normal-hearing and a hearing-impaired periphery is minimized; or wherein the difference between simulated auditory brainstem and/or cortical responses, expressed in the time or frequency domain, is minimized.

11. The method of claim 1, wherein a task-optimized speech 'back-end' which simulates the performance of listeners in different tasks is connected to the outputs of the auditory response models, also referred to as 'front-ends'; and wherein the outputs of the back-end are used to determine and minimize the auditory response difference.

12. The method of claim 1, for configuring an auditory device, wherein the auditory device is a cochlear implant or a wearable hearing aid.

13. The method of claim 1, wherein the auditory stimulus is processed to an auditory output by a cochlear implant or by a wearable hearing aid.

14. An auditory device, comprising:
an input device configured to pick up an input sound wave from the environment and convert the input sound wave to an auditory stimulus;
a processing unit configured for performing the method of claim 1 to produce a processed auditory output; and,
an output device configured to produce the processed auditory output from the processing unit.

15. The method of claim 1, wherein the generating of the neural network-based personalized auditory response model is further based on the integrity of inner hair cell damage, outer hair cell damage, or a combination of inner hair cell damage and outer hair cell damage in the subject.

16. The device of claim 14, wherein the auditory device is a cochlear implant or a wearable hearing aid.

17. A data storage device comprising a computer program product for implementing, when executed on a processor, the method of claim 1.

* * * * *